US008918636B2

(12) United States Patent
Kiefer et al.

(10) Patent No.: US 8,918,636 B2
(45) Date of Patent: Dec. 23, 2014

(54) SYSTEMS AND METHODS FOR PROTECTING ALTERNATIVE STREAMS IN ADAPTIVE BITRATE STREAMING SYSTEMS

(75) Inventors: Michael George Kiefer, Scottsdale, AZ (US); Eric William Grab, San Diego, CA (US); Jason Braness, San Diego, CA (US)

(73) Assignee: Sonic IP, Inc., San Deigo, CA (US)

( * ) Notice: Subject to any disclaimer, the term of this patent is extended or adjusted under 35 U.S.C. 154(b) by 296 days.

(21) Appl. No.: 13/341,265

(22) Filed: Dec. 30, 2011

(65) Prior Publication Data
US 2013/0061040 A1    Mar. 7, 2013

Related U.S. Application Data

(60) Provisional application No. 61/530,305, filed on Sep. 1, 2011.

(51) Int. Cl.
*H04L 29/06*     (2006.01)
*H04L 9/08*      (2006.01)

(52) U.S. Cl.
CPC ......... *H04L 9/0819* (2013.01); *H04L 2209/603* (2013.01)
USPC ........................................ 713/155; 713/150

(58) Field of Classification Search
CPC .. H04L 63/0823; H04L 65/602; H04L 65/607
USPC ................................................ 713/155, 150
See application file for complete search history.

(56) References Cited

U.S. PATENT DOCUMENTS

| | | | |
|---|---|---|---|
| 5,361,332 A | 11/1994 | Yoshida et al. | |
| 5,404,436 A | 4/1995 | Hamilton | |
| 5,502,766 A | 3/1996 | Boebert et al. | |
| 5,509,070 A | 4/1996 | Schull | |
| 5,715,403 A | 2/1998 | Stefik | |
| 5,754,648 A | 5/1998 | Ryan et al. | |
| 5,805,700 A | 9/1998 | Nardone et al. | |
| 5,892,900 A | 4/1999 | Ginter et al. | |
| 5,999,812 A | 12/1999 | Himsworth | |
| 6,031,622 A | 2/2000 | Ristow et al. | |
| 6,044,469 A | 3/2000 | Horstmann | |

(Continued)

FOREIGN PATENT DOCUMENTS

| | | |
|---|---|---|
| EP | 813167 A2 | 12/1997 |
| EP | 936812 A1 | 8/1999 |

(Continued)

OTHER PUBLICATIONS

International Search Report and Written Opinion for International Application PCT/US2011/068276, International Filing Date Dec. 31, 2011, Report completed Jun. 19, 2013, Mailed Jul. 8, 2013, 24 pgs.

(Continued)

*Primary Examiner* — Teshome Hailu
*Assistant Examiner* — Abiy Getachew
(74) *Attorney, Agent, or Firm* — KPPB LLP

(57) ABSTRACT

Systems and methods for performing adaptive bitrate streaming using alternative streams of protected content in accordance with embodiments of the invention are described. One embodiment includes a processor, and non-volatile storage containing an encoding application. In addition, the encoding application configures the processor to: receive source content; obtain common cryptographic information; encode the source content as a plurality of streams including a plurality of alternative streams of content; and protect the plurality of alternative streams of content using the common cryptographic information.

38 Claims, 19 Drawing Sheets

(56) References Cited

U.S. PATENT DOCUMENTS

| | | |
|---|---|---|
| 6,141,754 A | 10/2000 | Choy |
| 6,155,840 A | 12/2000 | Sallette |
| 6,175,921 B1 | 1/2001 | Rosen |
| 6,195,388 B1 | 2/2001 | Choi et al. |
| 6,282,653 B1 | 8/2001 | Berstis et al. |
| 6,289,450 B1 | 9/2001 | Pensak et al. |
| 6,449,719 B1 | 9/2002 | Baker |
| 6,466,671 B1 | 10/2002 | Maillard et al. |
| 6,510,513 B1 | 1/2003 | Danieli |
| 6,658,056 B1 | 12/2003 | Duruöz et al. |
| 6,807,306 B1 | 10/2004 | Girgensohn et al. |
| 6,810,389 B1 | 10/2004 | Meyer |
| 6,859,496 B1 | 2/2005 | Boroczky et al. |
| 6,956,901 B2 | 10/2005 | Boroczky et al. |
| 6,965,993 B2 | 11/2005 | Baker |
| 7,007,170 B2 | 2/2006 | Morten |
| 7,043,473 B1 | 5/2006 | Rassool et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,242,772 B1 | 7/2007 | Tehranchi |
| 7,328,345 B2 | 2/2008 | Morten et al. |
| 7,349,886 B2 | 3/2008 | Morten et al. |
| 7,356,143 B2 | 4/2008 | Morten |
| 7,376,831 B2 | 5/2008 | Kollmyer et al. |
| 7,406,174 B2 | 7/2008 | Palmer |
| 7,472,280 B2 | 12/2008 | Giobbi |
| 7,478,325 B2 | 1/2009 | Foehr |
| 7,484,103 B2 | 1/2009 | Woo et al. |
| 7,526,450 B2 | 4/2009 | Hughes et al. |
| 7,594,271 B2 | 9/2009 | Zhuk et al. |
| 7,640,435 B2 | 12/2009 | Morten |
| 7,817,608 B2 | 10/2010 | Rassool et al. |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,249,168 B2 | 8/2012 | Graves |
| 8,261,356 B2 | 9/2012 | Choi et al. |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1 | 10/2012 | Peacock |
| 8,311,115 B2 | 11/2012 | Gu et al. |
| 8,321,556 B1 | 11/2012 | Chatterjee et al. |
| 8,386,621 B2 | 2/2013 | Park |
| 8,412,841 B1 | 4/2013 | Swaminathan et al. |
| 8,456,380 B2 | 6/2013 | Pagan |
| 8,472,792 B2 | 6/2013 | Butt |
| 8,515,265 B2 | 8/2013 | Kwon et al. |
| 8,781,122 B2 | 7/2014 | Chan et al. |
| 2001/0046299 A1 | 11/2001 | Wasilewski et al. |
| 2002/0051494 A1 | 5/2002 | Yamaguchi et al. |
| 2002/0110193 A1 | 8/2002 | Yoo et al. |
| 2003/0001964 A1 | 1/2003 | Masukura et al. |
| 2003/0002578 A1 | 1/2003 | Tsukagoshi et al. |
| 2003/0035488 A1 | 2/2003 | Barrau |
| 2003/0035545 A1 | 2/2003 | Jiang |
| 2003/0035546 A1 | 2/2003 | Jiang et al. |
| 2003/0093799 A1 | 5/2003 | Kauffman et al. |
| 2003/0152370 A1 | 8/2003 | Otomo et al. |
| 2003/0163824 A1 | 8/2003 | Gordon et al. |
| 2003/0174844 A1 | 9/2003 | Candelore |
| 2003/0185542 A1 | 10/2003 | McVeigh et al. |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0081333 A1 | 4/2004 | Grab et al. |
| 2004/0105549 A1 | 6/2004 | Suzuki et al. |
| 2004/0136698 A1 | 7/2004 | Mock |
| 2004/0139335 A1 | 7/2004 | Diamand et al. |
| 2004/0158878 A1 | 8/2004 | Ratnakar et al. |
| 2004/0255115 A1 | 12/2004 | DeMello et al. |
| 2005/0038826 A1 | 2/2005 | Bae et al. |
| 2005/0071280 A1 | 3/2005 | Irwin |
| 2005/0114896 A1 | 5/2005 | Hug |
| 2005/0193070 A1 | 9/2005 | Brown et al. |
| 2005/0193322 A1 | 9/2005 | Lamkin et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0036549 A1 | 2/2006 | Wu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0129909 A1 | 6/2006 | Butt et al. |
| 2006/0173887 A1 | 8/2006 | Breitfeld et al. |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0047901 A1 | 3/2007 | Ando et al. |
| 2007/0083617 A1 | 4/2007 | Chakrabarti et al. |
| 2007/0086528 A1 | 4/2007 | Mauchly et al. |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0180125 A1 | 8/2007 | Knowles et al. |
| 2007/0192810 A1 | 8/2007 | Pritchett et al. |
| 2007/0239839 A1 | 10/2007 | Buday et al. |
| 2007/0255940 A1 | 11/2007 | Ueno |
| 2007/0292107 A1 | 12/2007 | Yahata et al. |
| 2008/0120389 A1 | 5/2008 | Bassali et al. |
| 2008/0126248 A1 | 5/2008 | Lee et al. |
| 2008/0137736 A1 | 6/2008 | Richardson et al. |
| 2008/0192818 A1 | 8/2008 | DiPietro et al. |
| 2008/0195744 A1 | 8/2008 | Bowra et al. |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1* | 5/2009 | Soroushian et al. ......... 709/231 |
| 2009/0132824 A1 | 5/2009 | Terada et al. |
| 2009/0150557 A1 | 6/2009 | Wormley et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0290706 A1* | 11/2009 | Amini et al. .................. 380/42 |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2009/0328228 A1* | 12/2009 | Schnell ............................ 726/26 |
| 2010/0040351 A1 | 2/2010 | Toma et al. |
| 2010/0074324 A1 | 3/2010 | Qian et al. |
| 2010/0083322 A1 | 4/2010 | Rouse |
| 2010/0095121 A1 | 4/2010 | Shetty et al. |
| 2010/0107260 A1 | 4/2010 | Orrell et al. |
| 2010/0111192 A1 | 5/2010 | Graves |
| 2010/0158109 A1 | 6/2010 | Dahlby et al. |
| 2010/0186092 A1 | 7/2010 | Takechi et al. |

(56) References Cited

U.S. PATENT DOCUMENTS

| | | |
|---|---|---|
| 2010/0189183 A1 | 7/2010 | Gu et al. |
| 2010/0228795 A1 | 9/2010 | Hahn |
| 2010/0235472 A1 | 9/2010 | Sood et al. |
| 2011/0047209 A1 | 2/2011 | Lindholm et al. |
| 2011/0066673 A1 | 3/2011 | Outlaw |
| 2011/0080940 A1 | 4/2011 | Bocharov |
| 2011/0082924 A1 | 4/2011 | Gopalakrishnan |
| 2011/0126191 A1 | 5/2011 | Hughes et al. |
| 2011/0135090 A1 | 6/2011 | Chan et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0197237 A1 | 8/2011 | Turner |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0268178 A1 | 11/2011 | Park |
| 2011/0302319 A1 | 12/2011 | Ha et al. |
| 2011/0305273 A1 | 12/2011 | He et al. |
| 2011/0314176 A1 | 12/2011 | Frojdh et al. |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0179834 A1 | 7/2012 | Van Der Schaar et al. |
| 2012/0254455 A1 | 10/2012 | Adimatyam et al. |
| 2012/0260277 A1 | 10/2012 | Kosciewicz |
| 2012/0278496 A1 | 11/2012 | Hsu |
| 2012/0307883 A1 | 12/2012 | Graves |
| 2012/0311094 A1 | 12/2012 | Biderman et al. |
| 2013/0019107 A1 | 1/2013 | Grab et al. |
| 2013/0044821 A1 | 2/2013 | Braness et al. |
| 2013/0046902 A1 | 2/2013 | Villegas Nuñez et al. |
| 2013/0061045 A1 | 3/2013 | Kiefer et al. |
| 2013/0166765 A1 | 6/2013 | Kaufman |
| 2013/0166906 A1 | 6/2013 | Swaminathan et al. |
| 2014/0101722 A1 | 4/2014 | Moore |
| 2014/0189065 A1 | 7/2014 | Schaar et al. |
| 2014/0201382 A1 | 7/2014 | Shivadas et al. |

FOREIGN PATENT DOCUMENTS

| | | |
|---|---|---|
| JP | 2005080204 A | 3/2005 |
| JP | 2006524007 A | 10/2006 |
| WO | 0165762 A2 | 9/2001 |
| WO | 02/37210 A2 | 5/2002 |
| WO | 02/054196 A2 | 7/2002 |
| WO | 2004102571 A1 | 11/2004 |
| WO | 2008010275 A1 | 1/2008 |
| WO | 2009065137 A1 | 5/2009 |
| WO | 2010060106 A1 | 5/2010 |
| WO | 2010122447 A1 | 10/2010 |
| WO | 2011068668 A1 | 6/2011 |
| WO | 2011103364 A1 | 8/2011 |
| WO | WO 2011103364 A1 * | 8/2011 |
| WO | 2012/094189 A1 | 7/2012 |
| WO | 2012094171 A1 | 7/2012 |
| WO | 2012094181 A2 | 7/2012 |
| WO | 2013032518 A2 | 3/2013 |
| WO | 2013032518 A3 | 9/2013 |

OTHER PUBLICATIONS

"IBM Closes Cryptolopes Unit," Dec. 17, 2007, CNET News, Retrieved from http://news.cnet.com/IBM-closes-Cryptolopes-unit/2100-1001_3206465.htm, 3 pgs.

"IBM Spearheading Intellectual Property Protection Technology for Information on the Internet; Cryptolope Containers Have Arrived," May 1, 1996, Business Wire, Retrieved from http://www.thefreelibrary.com/IBM+Spearheading+Intellectual+Property+Protection+Technology+for...-a018239381, 1 pg.

Nelson, Michael, "IBM's Cryptolopes," Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pgs.

"Information Technology-Coding of Audio Visual Objects—Part 2: Visual" International Standard, ISO/IEC 14496-2, Third Edition, Jun. 1, 2004, pp. 1-724.

Cloakware Corporation, "Protecting Digital Content Using Cloakware Code Transformation Technology", Version 1.2, May 2002, pp. 1-10.

European Search Report for Application 11855103.5, search completed Jun. 26, 2014, 9 pgs.

European Search Report for Application 11855237.1, search completed Jun. 25, 2014, 9 pgs.

Federal Computer Week, "Tool Speeds Info to Vehicles", Jul. 25, 1999, 5 pages.

HTTP Live Streaming Overview, Networking & Internet, Apple, Inc., Apr. 1, 2011, 38 pages.

International Preliminary Report on Patentability for International Application No. PCT/US2011/068276, International Filing Date Dec. 31, 2011, Issue Date Mar. 4, 2014, 23 pgs.

International Search Report and Written Opinion for International Application No. PCT/US2010/56733, International Filing Date Nov. 15, 2010, Search Completed Jan. 3, 2011, Mailed Jan. 14, 2011, 9 pgs.

International Search Report and Written Opinion for International Application PCT/US2011/066927, International Filing Date Dec. 22, 2011, Report Completed Apr. 3, 2012, Mailed Apr. 20, 2012, 14 pgs.

International Search Report and Written Opinion for International Application PCT/US2011/067167, International Filing Date Dec. 23, 2011, Report Completed Jun. 19, 2012, Mailed Jul. 2, 2012, 11 pgs.

International Search Report for International Application No. PCT/US2005/025845 filed Jul. 21, 2005, report completed Feb. 5, 2007 and mailed May 10, 2007, 3 pgs.

International Search Report for International Application No. PCT/US2007/063950 filed Mar. 14, 2007, report completed Feb. 19, 2008; report mailed Mar. 19, 2008, 3 pgs.

ITS International, "Fleet System Opts for Mobile Server", Aug. 26, 1999, 1 page.

Microsoft, Microsoft Media Platform: Player Framework, "Silverlight Media Framework v1.1", 2 pages, Jan. 2010.

Microsoft, Microsoft Media Platform: Player Framework, "Microsoft Media Platform: Player Framework v2.5 (formerly Silverlight Media Framework)", 2 pages, Jul. 7, 2010.

The Official Microsoft IIS Site, Smooth Streaming Client, 4 pages, Mar. 2009.

Written Opinion for International Application No. PT/US2005/025845 filed Jul. 21, 2005, report completed Feb. 5, 2007 and mailed May 10, 2007, 5 pgs.

Written Opinion for International Application No. PCT/US2007/063950 filed Mar. 14, 2007, report completed Mar. 1, 2008; report mailed Mar. 19, 2008, 5 pgs.

"Adaptive Streaming Comparison", Jan. 28, 2010, 5 pgs.

"Best Practices for Multi-Device Transcoding", Kaltura Open Source Video, 13 pgs., Nov. 27, 2013.

"Informationweek: Front End: Daily Dose, Internet on Wheels", Jul. 20. 1999, 3 pgs.

Supplementary European Search Report for Application No. EP 10834935, International Filing Date Nov. 15, 2010, Search Completed May 27, 2014, 9 pgs.

"Supported Media Formats", Supported Media Formats, Android Developers, Nov. 27, 2013, 3 pgs.

"Thread: SSME (Smooth Streaming Medial Element) config.xml review (Smooth Streaming Client configuration file)", 3 pgs., Oct. 7, 2010.

"Transcoding Best Practices", From movideo, Nov. 27, 2013, 5 pgs.

(56) References Cited

OTHER PUBLICATIONS

"Using HTTP Live Streaming", iOS Developer Library, http://developer.apple.com/library/ios/#documentation/networkinginternet/conceptual/streamingmediaguide/UsingHTTPLiveStreaming.html#//apple_ref/doc/uid/TP40008332-CH102-SW1, 10 pgs., Feb. 11, 2014.
Akhshabi et al., "An Experimental Evaluation of Rate-Adaptation Algorithms in Adaptive Streaming over HTTP", MMSys'11, Feb. 24-25, 2011, 12 pgs.
Anonymous, "Method for the encoding of a compressed video sequence derived from the same video sequence compressed at a different bit rate without loss of data", ip.com, ip.com number: IPCOM000008165D, May 22, 2012, pp. 1-9.
Author Unknown, "Entropy and Source Coding (Compression)", TCOM 570, Sep. 1999, pp. 1-22.
Author Unknown, "MPEG-4 Video Encoder: Based on International Standard ISO/IEC 14496-2", Patni Computer Systems, Ltd., Publication date unknown, 15 pgs.
Author Unknown, "Tunneling QuickTime RTSP and RTP over HTTP", Published by Apple Computer, Inc.: 1999 (month unknown), 6 pages.
Blaisak, "Video Transrating and Transcoding: Overview of Video Transrating and Transcoding Technologies", Ingenient Technologies, TI Developer Conference, Aug. 6-8, 2002, 22 pgs.
Deutscher, "IIS Transform Manager Beta—Using the MP4 to Smooth Task", Retrieved from: https://web.archive.org/web/20130328111303/http://blogjohndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Inlet Technologies, "Adaptive delivery to iPhone 3.0", 2 pgs., 2009.
Inlet Technologies, "The World's First Live Smooth Streaming Event: The French Open", 2 pages, 2009.
Kim, Kyuheon, "MPEG-2 ES/PES/TS/PSI", Kyung-Hee University, Oct. 4, 2010, 66 pages.
Kurzke et al., "Get Your Content Onto Google TV", Google, Retrieved from: http://commondatastorage.googleapis.com/io2012/presentations/live%20to%20website/1300.pdf, 58 pgs., 2012.
Lang, "Expression Encoder, Best Practices for live smooth streaming broadcasting", Microsoft Corporation, 20 pgs. Aug. 2010.
Nelson, "Arithmetic Coding + Statistical Modeling = Data Compression: Part 1—Arithmetic Coding", Doctor Dobb's Journal, Feb. 1991, printed from http://www.dogma.net/markn/articles/arith/artl.htm; printed Jul. 2, 2003, 12 pgs.
Nelson, "Smooth Streaming Deployment Guide", Microsoft Expression Encoder, Aug. 2010, 66 pgs.
Noe, Alexander, "Matroska File Format (under construction !)", Jun. 24, 2007, XP002617671, Retrieved: http://web.archive.org/web/20070821155146/www.matroska.org/technical/specs/matroska.pdf, Retrieved on Jan. 19, 2011, pp. 1-51.
Ozer, "The 2012 Encoding and Transcoding Buyers' Guide", Streamingmedia.com, Retrieved from: http://vvww.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantoshttp-live-streaming-10, 37 pgs.
Pantos, R., "HTTP Live Streaming: draft-pantos-http-live-streaming-06", Published by the Internet Engineering Task Force (IETF), Mar. 31, 2011, 24 pages.
Phamdo, Nam "Theory of Data Compression", printed from http://www.data-compression.com/theoroy.html on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs. Feb. 2012.
Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.
Siglin, "HTTP Streaming: What You Need to Know", streamingmedia.com, 2010, 12 pages.
Siglin, "Unifying Global Video Strategies, MP4 File Fragmentation for Broadcast, Mobile and Web Delivery", Nov. 16, 2011, 16 pgs.
Wu, Feng et al., "Next Generation Mobile Multimedia Communications: Media Codec and Media Transport Perspectives", in China Communications, Oct. 2006, pp. 30-44.
Zambelli, Alex, "IIS Smooth Streaming Technical Overview", Microsoft Corporation, Mar. 2009.

\* cited by examiner

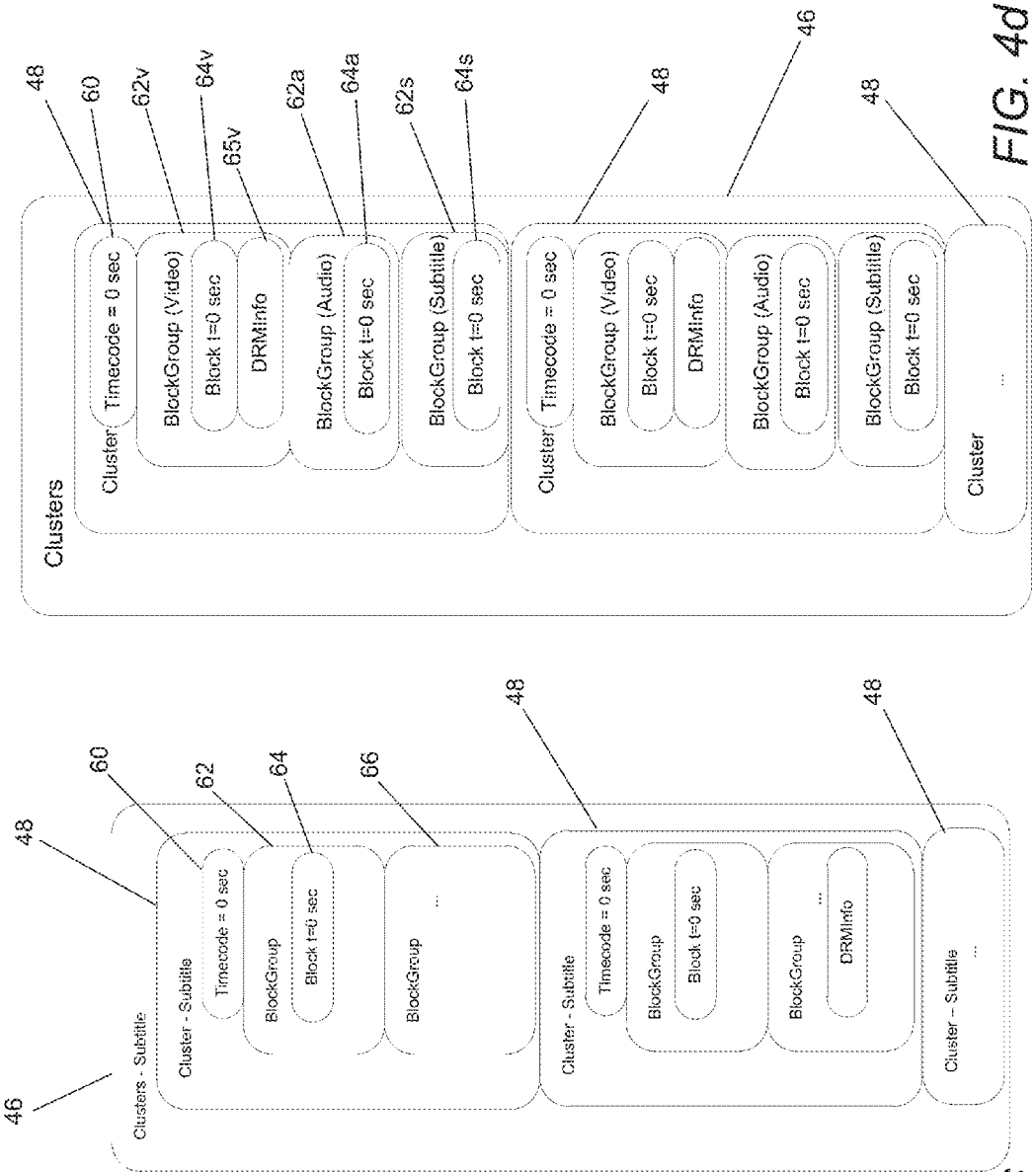

SYSTEMS AND METHODS FOR PROTECTING ALTERNATIVE STREAMS IN ADAPTIVE BITRATE STREAMING SYSTEMS

CROSS REFERENCE TO RELATED APPLICATIONS

This application claims priority to U.S. Provisional. Application Ser. No. 61/530,305 filed Sep. 1, 2011, entitled "Multi-Asset Protected Content Multimedia Delivery System" the entirety of which is incorporated herein by reference.

FIELD OF THE INVENTION

The present invention generally relates to adaptive streaming and more specifically to adaptive bitrate streaming of encoded media contained within Matroska container files using Hypertext Transfer Protocol.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. In many instances, content is divided into multiple streams. For example, content can be divided into audio, video, and subtitle streams and some streams can be encoded as alternative streams that are suitable for different network connection bandwidths or comply with specific geographic restrictions and/or other restrictions.

Adaptive bit rate streaming or adaptive streaming involves detecting the present streaming conditions (e.g. the user's network bandwidth and CPU capacity) in real time and adjusting the quality of the streamed media accordingly by selecting between different streams encoded for use at different network connection data rates. Typically, the source media is encoded at multiple bitrates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616 to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Rash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Rash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

The term Digital. Rights Management (DRM) is utilized to describe access control technologies that are used to control access to and/or copying of digital content. DRM systems typically involve the use of cryptographic information to control access to or protect a piece of content. Content protection is typically achieved using cryptographic information such as (but not limited to) one or more encryption keys to encrypt some or all of the content. An important component of most DRM systems is a mechanism for securely providing cryptographic information to authorized playback devices for use in accessing protected content. The protected content cannot be accessed without the cryptographic data and ideally the cryptographic data is bound to specific playback devices and cannot be readily used by unauthorized playback devices or is securely provided to the playback devices (often on a session basis).

SUMMARY OF THE INVENTION

Systems and methods in accordance with embodiments of the invention perform adaptive bitrate streaming using alternative streams of protected content. One embodiment includes a processor, and non-volatile storage containing an encoding application. In addition, the encoding application configures the processor to: receive source content; obtain common cryptographic information; encode the source content as a plurality of streams including a plurality of alternative streams of content; and protect the plurality of alternative streams of content using the common cryptographic information.

In a further embodiment, the encoding application configures the processor to encode and protect the source content by configuring the processor to: encode a portion of source content; and encrypt at least one portion of the encoded portion of content so that the at least one encrypted portion can be accessed using the common cryptographic information.

In another embodiment, the encoding application configures the processor to obtain common cryptographic information by configuring the processor to: send a request to a DRM server for common cryptographic information; and receive the common cryptographic information from the DRM server.

In a still further embodiment, a title ID is associated with the common cryptographic content and the plurality of alternative streams of protected content.

In still another embodiment, the encoding application configures the processor to write each of the alternative streams of protected content to a separate container file.

In a yet further embodiment, the encoding application configures the processor to write at least a portion of the common cryptographic information encrypted using at least one encryption key to each of the container files containing the alternative streams of protected content.

In yet another embodiment, writing the at least a portion of the common cryptographic information to the container files containing the alternative streams of protected content includes s encrypting the at least a portion of the common cryptographic information written to each of the container files using at least one encryption key.

In a further embodiment again, writing the at least a portion of the common cryptographic information to the container files containing the alternative streams of protected content includes encrypting the at least a portion of the common cryptographic information written to each of the container files using the same encryption key.

In another embodiment again, the container files are Matroska container files.

In a further additional embodiment, the encoding application configures the processor to write a DRMHeader element to the TracksData element in a Tracks element within each of the Matroska container files, where the DRMHeader element includes an encrypted copy of the common cryptographic information.

In another additional embodiment, the common cryptographic information is a set of encryption keys, and the encoding application configures the processor to: encrypt the set of encryption keys using at least one encryption key; and write the encrypted set of encryption keys to the DRMHeader element of each of the Matroska container files.

In a still yet further embodiment, the source content includes a stream of video, and the encoding application configures the processor to: encode a frame of video; protect the encoded frame of video by encrypting at least a portion of the encoded frame of video; and write a BlockGroup element to a Matroska container file including a DRMInfo element identifying the at least one portion of the encoded frame of video that is encrypted and at least one encryption key from the set of encryption keys used to access the at least one encrypted portion of the encoded frame of video.

In still yet another embodiment, the encoding application further configures the processor to: generate an index for each Matroska container file during the encoding of each of the streams of protected content; and write a Cues element containing the index to the indexed Matroska container file.

An embodiment of the method of the invention includes receiving source content using a source encoder, obtaining common cryptographic information using a source encoder, encoding the source content as a plurality of streams including a plurality of alternative streams of content using the source encoder, and protecting the plurality of alternative streams of content using the source encoder and the common cryptographic information.

A further embodiment of the method of the invention also includes encoding a portion of source content using the source encoder, and encrypting at least one portion of the encoded content using the source encoder so that the at least one encrypted portion can be accessed using the common cryptographic information.

In another embodiment of the method of the invention, obtaining common cryptographic information includes sending a request to a DRM server for common cryptographic information using the source encoder, and receiving the common cryptographic information from the DRM server.

A still further embodiment of the method of the invention also includes associating a title ID with the common cryptographic content and the plurality of alternative streams of protected content.

Still another embodiment of the method of the invention also includes writing each of the alternative streams of protected content to a separate container file using the source encoder.

A yet further embodiment of the method of the invention also includes writing at least a portion of the common cryptographic information encrypted using at least one encryption key to each of the container files containing the alternative streams of protected content using the source encoder.

In yet another embodiment of the method of the invention, writing the at least a portion of the common cryptographic information to the container files containing the alternative streams of protected content includes encrypting the at least a portion of the common cryptographic information written to each of the container files using at least one encryption key.

In a further embodiment again of the method of the invention, writing the at least a portion of the common cryptographic information to the container files containing the alternative streams of protected content includes encrypting the at least a portion of the common cryptographic information written to each of the container files using the same encryption key.

In another embodiment again of the method of the invention, the container files are Matroska container files.

A further additional embodiment of the method of the invention also includes writing a DRMHeader element to a TracksData element in a Tracks element within each of the Matroska container files using the source encoder, where the DRMHeader element includes an encrypted copy of the common cryptographic information.

In another additional embodiment of the method of the invention, the common cryptographic information is a set of encryption keys and the method further includes: encrypting the set of encryption keys using at least one encryption key using the source encoder; and writing the encrypted set of encryption keys to the DRMHeader element of each of the Matroska container files using the source encoder.

In a still yet further embodiment of the method of the invention, the source content includes a stream of video and the method further includes: encoding a frame of video using the source encoder; protecting the encoded frame of video by encrypting at least a portion of the encoded frame of video using the source encoder; and writing a BlockGroup element to a Matroska container file including a DRMInfo element identifying the at least one portion of the encoded frame of video that is encrypted and at least one encryption key from the set of encryption keys used to access the at least one encrypted portion of the encoded frame of video using the source encoder.

Still yet another embodiment of the method of the invention also includes generating an index for each Matroska container file using the source encoder during the encoding of each of the streams of protected content; and writing a Cues element containing the index to the indexed Matroska container file using the source encoder.

Another embodiment of the invention includes a machine readable medium containing processor instructions, where execution of the instructions by a processor causes the processor to perform a process including receiving source content, obtaining common cryptographic information, encoding the source content as a plurality of streams including a plurality of alternative streams of content, and protecting the plurality of alternative streams of content and the common cryptographic information.

In a further embodiment, the machine readable medium is non-volatile memory.

A further embodiment includes a DRM server, and a content distribution server, where the content distribution server stores a plurality of container files containing alternative streams of protected content associated with a title, the alternative streams of protected content are protected using common cryptographic information, and each container file includes a copy of the common cryptographic information encrypted using at least one encryption key. In addition, the DRM server is configured to receive a request for access to the alternative streams of protected content associated with the title from a playback device, and securely provide a copy of the at least one encryption key used to encrypt the common cryptographic information to the playback device. Furthermore, the content distribution server is configured to grant the playback device access to the alternative streams of protected content.

In a still further embodiment, the DRM server is configured to associate a title ID with the title.

In still another embodiment, the DRM server is configured to associate the common cryptographic information with the title ID.

In a yet further embodiment, the request for access to the alternative streams of protected content associated with the title includes a request identifying a title ID.

In yet another embodiment, the content distribution server is further configured to: receive requests for portions of at least one container file from the playback device; and provide the requested portions of the at least one container file to the playback device.

In a further embodiment again, the plurality of container files are Matroska container files.

In another embodiment again, the common cryptographic information includes a set of encryption keys; and the set of encryption keys are encrypted using the at least one encryption key.

A further additional embodiment, also includes a source encoder configured to receive source content, obtain common cryptographic information from the DRM server, encode the source content as a plurality of streams including a plurality of alternative streams of content, protect the plurality of alternative streams of content using the common cryptographic information, protect the common cryptographic information using at least one encryption key, and provide a plurality of container files containing the plurality of alternative streams of protected content to the content distribution server.

In another additional embodiment, the source encoder is configured to encode a portion of content, and encrypt at least one portion of the encoded content so that the at least one encrypted portion can be accessed using the common cryptographic information.

In a still yet further embodiment, the source encoder is configured to write each of the alternative streams of protected content to a separate container file.

In still yet another embodiment, the source encoder is configured to encrypt at least a portion of the common cryptographic information using at least one encryption key and write the encrypted information to each of the container files containing the alternative streams of protected content.

In a still further embodiment again, the source encoder is configured to encrypt at least a portion of the common cryptographic information using a single encryption key and write the encrypted information to each of the container files containing the alternative streams of protected content.

In still another embodiment again, the container files are Matroska container files.

In a still further additional embodiment, the source encoder is configured to write a DRMHeader element to a TracksData element in a Tracks element within each of the Matroska container files, where the DRMHeader element includes an encrypted copy of the common cryptographic information.

In still another additional embodiment, the common cryptographic information includes a set of encryption keys, and the source encoder is configured to: encrypt the set of encryption keys using at least one encryption key; and write the encrypted set of encryption keys to the DRMHeader element of each of the Matroska container files.

In a yet further embodiment again, the source content includes a stream of video, and the source encoder is configured to: encode a frame from the stream of video; protect the encoded frame of video by encrypting at least a portion of the encoded frame of video; and write a BlockGroup element to a Matroska container file including a DRMInfo element identifying the at least one portion of the encoded frame of video that is encrypted and at least one encryption key from the set of encryption keys used to access the at least one encrypted portion of the encoded frame of video.

In yet another embodiment again, the source encoder is configured to: generate an index for each Matroska container file during the encoding of each of the streams of protected content; and write a Cues element containing the index to the indexed Matroska container file.

In a yet further additional embodiment, the plurality of container files are Matroska container files.

In yet another additional embodiment, the source encoder is configured to write a DRMHeader element to a TracksData element in a Tracks element within each of the Matroska container files, where the DRMHeader element includes an encrypted copy of the common cryptographic information.

In a further additional embodiment again, the common cryptographic information includes a set of encryption keys, and the source encoder is configured to encrypt the set of encryption keys using the at least one encryption key.

A further embodiment of the method of the invention includes receiving a request for access to the alternative streams of protected content associated with the title from a playback device using a DRM server, securely providing to the playback device at least one encryption key using the DRM server, where the at least one encryption keys is used to access the encrypted common cryptographic information, and granting the playback device access to the alternative streams of protected content using a content distribution server.

In another embodiment of the method of the invention, the title is identified using a title ID.

In a still further embodiment of the method of the invention, the common cryptographic information is associated with the title ID.

In still another embodiment of the method of the invention, the request for access to the alternative streams of protected content associated with the title includes a request identifying a title ID.

A yet further embodiment of the method of the invention also includes receiving requests for portions of at least one container file from the playback device using the content distribution server, and providing the requested portions of the at least one container file to the playback device using the content distribution server.

In yet another embodiment of the invention, the plurality of container files are Matroska container files.

In a further embodiment again of the method of the invention, the common cryptographic information includes a set of encryption keys, and the set of encryption keys is encrypted using the at least one encryption key.

Another embodiment again of the method of the invention also includes receiving source content using a source encoder, obtaining common cryptographic information from the DRM server using a source encoder, encoding the source content as a plurality of streams including a plurality of alternative streams of content using the source encoder, protecting the plurality of alternative streams of content using the source encoder and the common cryptographic information, encrypting the common cryptographic information using the source encoder and at least one encryption key, and providing the plurality of alternative streams of content and the encrypted common cryptographic information to a content distribution server using the source encoder.

A further additional embodiment of the invention also includes encoding a portion of content using the source encoder, and encrypting at least one portion of the encoded content using the source encoder so that the at least one encrypted portion can be accessed using the common cryptographic information.

Another additional embodiment of the invention also includes writing each of the alternative streams of protected content to a separate container file.

In a still yet further embodiment of the method of the invention, the container files are Matroska container files.

Still yet another embodiment of the method of the invention also includes writing a DRMHeader element to a TracksData element in a Tracks element within each of the Matroska container files using the source encoder, where the DRMHeader element includes an encrypted copy of the common cryptographic information.

In a still further embodiment again of the method of the invention, the common cryptographic information includes a set of encryption keys, the method also includes: encrypting the set of encryption keys using the at least one encryption key; and writing the encrypted set of encryption keys to the DRMHeader element of each of the Matroska container files using the source encoder.

In still another embodiment again of the method of the invention, the source content includes a stream of video, the method further includes encoding a frame from the stream of video using the source encoder, protecting the encoded frame of video by encrypting at least a portion of the encoded frame of video using the source encoder, and writing a BlockGroup element to a Matroska container file including a DRMInfo element identifying the at least one portion of the encoded frame of video that is encrypted and at least one encryption key from the set of encryption keys used to access the at least one encrypted portion of the encoded frame of video using the source encoder.

A still further additional embodiment of the method of the invention also includes generating an index for each Matroska container file during the encoding of each of the streams of protected content using the source encoder, and writing a Cues element containing the index to the indexed Matroska container file using the source encoder.

In a yet further embodiment again of the method of the invention, the plurality of container files are Matroska container files.

Yet another embodiment again of the method of the invention also includes writing a DRMHeader element to a TracksData element in a Tracks element within each of the Matroska container files using the source encoder, where the DRMHeader element includes an encrypted copy of the common cryptographic information.

In a yet further additional embodiment of the method of the invention, the common cryptographic information includes a set of encryption keys, and the method further comprising encrypting the set of encryption keys using the source encoder and at least one encryption key.

BRIEF DESCRIPTION OF THE DRAWINGS

FIGS. 4a-4c conceptually illustrate the insertion of different types of protected media into the Clusters element of a Matroska container file subject to various constraints that facilitate adaptive bitrate streaming in accordance with embodiments of the invention.

FIG. 4d conceptually illustrates the multiplexing of different types of protected media into the Clusters element of a Matroska container file subject to various constraints that facilitate adaptive bitrate streaming in accordance with an embodiment of the invention.

DETAILED DISCLOSURE OF THE INVENTION

Figure 1A:
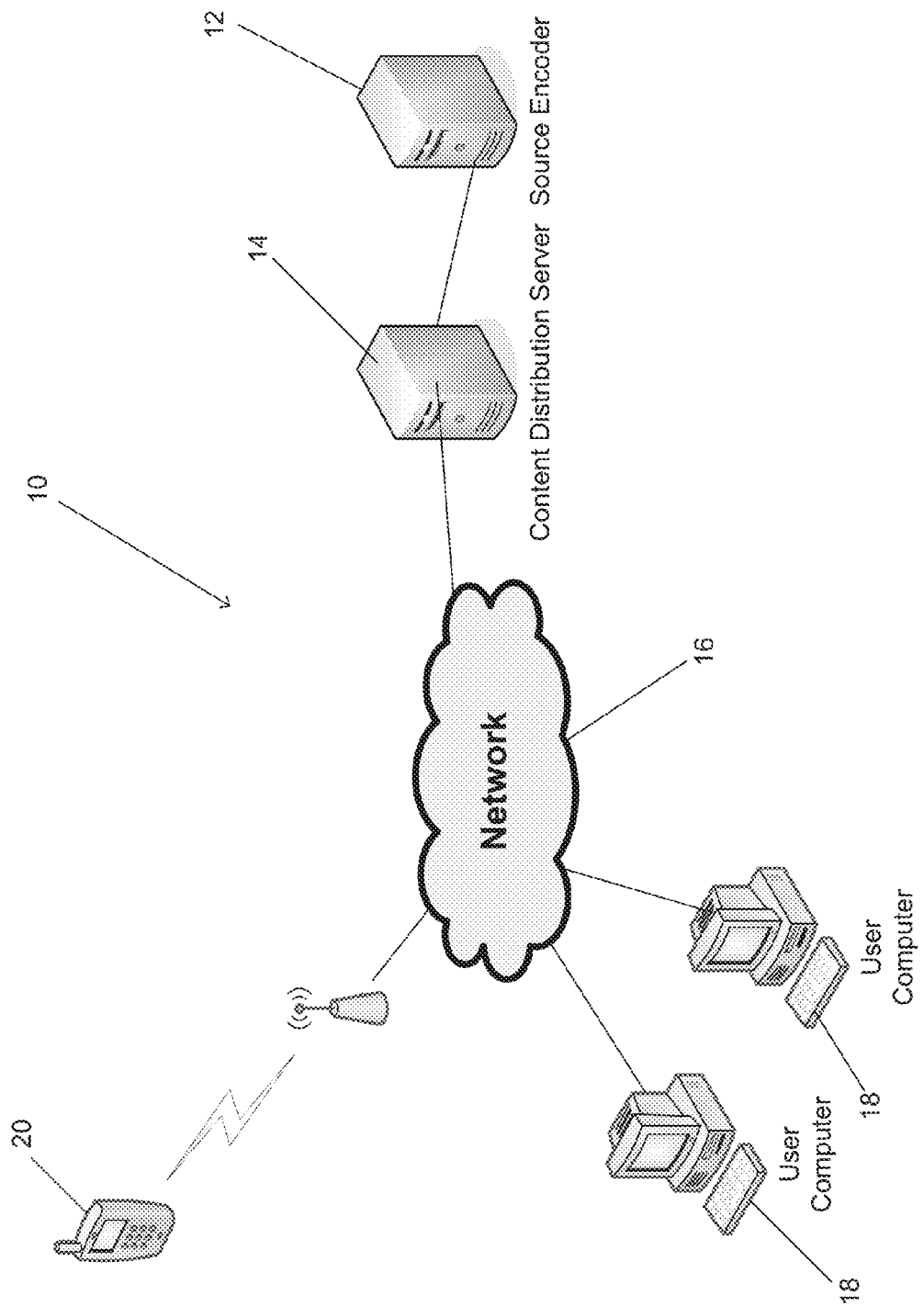
FIG. 1A is a network diagram of an adaptive bitrate streaming system in accordance with an embodiment of the invention.

Turning now to the drawings, systems and methods for performing adaptive bitrate streaming using alternative streams of protected content in accordance with embodiments of the invention are illustrated. In a number of embodiments, source media is encoded as a number of alternative streams and the alternative streams are protected using a common set of cryptographic information. In many embodiments, the alternative streams are video streams and each stream is protected by encrypting at least a portion of a plurality of video frames within the stream using the common set of cryptographic information. In several embodiments, the common set of cryptographic information is a set of frame keys. In order to protect a video frame, a frame key can be selected from the set of frame keys and used to encrypt at least a portion of the encoded frame and DRM information can be provided with the protected frame indicating the frame key utilized to perform the encryption and the location of the encrypted portion within the frame. By encrypting each of the alternative streams using the same set of cryptographic information, a playback device can switch between streams without the need to maintain or acquire multiple sets of cryptographic information in memory or to reinitialize the decryption engine of the playback device with a different set of cryptographic information.

In many embodiments, each of the alternative streams is stored in a separate container file referenced by a top level index file. In several embodiments, the common cryptographic information is embedded in each of the container files so that a playback device has access to the cryptographic information irrespective of which alternative is initially select to commence playback of the media. The common cryptographic information can be stored on a content distribution system and associated with a title identifier or title ID that uniquely identifies the source content used to create the alternative streams. When a new alternative stream is generated, a source encoder can utilize the title ID to request the common cryptographic information from the content distribution system and the common cryptographic information can be utilized to encrypt the new alternative stream and embedded in a container file created to contain the new encrypted alternative stream.

In several embodiments, each stream associated with a piece of source content and/or title ID is stored in a Matroska (MKV) container file. In many embodiments, the Matroska container file is a specialized Matroska container file in that the manner in which the media in each stream is encoded and stored within the container is constrained to improve streaming performance. In several embodiments, the Matroska container file is further specialized in that additional DRM elements (i.e. elements that are not specified as part of the Matroska container format) can be included within the file to facilitate the distribution of protected media during adaptive bitrate streaming. In a number of embodiments, common cryptographic information is included within a DRM header element in each of the Matroska container files and references to the common cryptographic information are made using DRMInfo elements within a BlockGroup element corresponding to a specific frame of encrypted video. In other embodiments, any of a variety of mechanisms can be utilized to store DRM information within a Matroska container in accordance with embodiments of the invention. In several embodiments, each stream (i.e. audio, video, or subtitle) is stored within a separate Matroska container file. In other embodiments, an encoded video stream is multiplexed with one or more encoded audio, and/or subtitle streams in each Matroska container file.

A top level index file containing an index to the streams contained within each of the container files is also generated to enable adaptive bitrate streaming of the encoded media. In many embodiments, the top level index file is a Synchronized Multimedia Integration Language (SMIL) file containing URIs for each of the Matroska container files. In other embodiments, any of a variety of file formats can be utilized in the generation of the top level index file.

The performance of an adaptive bitstrate streaming system in accordance with embodiments of the invention can be significantly enhanced by encoding each portion of the source video at each bit rate in such a way that the portion of video is encoded in each stream as a single (or at least one) closed group of pictures (GOP) starting with an Instantaneous Decoder Refresh (IDR) frame. The GOP for each stream can then be stored as a Cluster element within the Matroska container file for the stream. In this way, the playback device can switch between streams at the completion of the playback of a Cluster and, irrespective of the stream from which a Cluster is obtained the first frame in the Cluster will be an IDR frame and can be decoded without reference to any encoded media other than the encoded media contained within the Cluster element. In many embodiments, the sections of the source video that are encoded as GOPs are all the same duration. In a number of embodiments each two second sequence of the source video is encoded as a GOP.

Adaptive streaming of source media encoded in the manner outlined above can be coordinated by a playback device in accordance with embodiments of the invention. The playback device obtains information concerning each of the available streams from the top level index file and selects one or more streams to utilize in the playback of the media. The playback device can then obtain header information from the Matroska container files containing the one or more bitstreams or streams, and the headers provide information concerning the decoding of the streams including a DRM header, which contains the cryptographic information utilized to protect the stream. The playback device can also request index information that indexes the encoded media stored within the relevant Matroska container files. The index information can be stored within the Matroska container files or separately from the Matroska container files in the top level index or in separate index files. The index information enables the playback device to request byte ranges corresponding to Cluster elements within the Matroska container file containing specific portions of encoded media via HTTP from the server. As the playback device receives the Cluster elements from the HTTP server, the playback device can evaluate current streaming conditions to determine whether to increase or decrease the bitrate of the streamed media. In the event that the playback device determines that a change in bitrate is necessary, the playback device can obtain header information and index information for the container file(s) containing the desired streams) (assuming the playback device has not already obtained this information). The playback device need not perform the computationally intensive process of accessing the encrypted cryptographic information in the header of the new stream, because each of the alternative streams uses common cryptographic information. The index information can then be used to identify the byte range of the Cluster element containing the next portion of the source media encoded at the desired bit rate and the identified Cluster element can be retrieved from the server via HTTP. The next portion of the source media that is requested is typically identified based upon the Cluster elements already requested by the playback device and the Cluster elements buffered by the playback device. The next portion of source media requested from the alternative stream is requested to minimize the likelihood that the buffer of the playback device will underflow (i.e. run out media to playback) prior to receipt of the Cluster element containing the next portion of source media by the playback device. In this way, the playback device can achieve adaptive bitrate streaming by retrieving sequential. Cluster elements from the various streams as appropriate to the streaming conditions using the top level index and index information describing the Cluster elements within each of the Matroska container files.

In a number of embodiments, variation in the bitrate between different streams can be achieved by modifying the encoding parameters for each stream including but not limited to the bitrate, frame rate, resolution and sample aspect ratio. The encoding and protection of source video using common cryptographic information for use in adaptive bitrate streaming and the playback of alternative streams of protected content via adaptive bitrate streaming in accordance with embodiments of the invention is discussed further below.

Adaptive Streaming System Architecture

An adaptive bitrate streaming system in accordance with an embodiment of the invention is illustrated in FIG. 1. The adaptive streaming system 10 includes a source encoder 12 configured to encode source media as a number of alternative streams and to protect the encoded streams using common cryptographic information. Alternative streams are streams that encode the same media content in different ways. In several embodiments, the source encoder 12 ingests source content and obtains a title ID and common cryptographic information from a content distribution server 14 that the content distribution server assigns to the source content. The source encoder encodes the alternative streams and protects the streams using the common cryptographic information received from the content distribution server. In many instances, alternative streams encode media content (such as but not limited to video) at different maximum bitrates. In a number of embodiments, the alternative streams are encoded with different resolutions, sample aspect ratios and/or frame rates. When the streams are written to file(s), the common cryptographic information is also written to the file(s). The content distribution server 14 can receive request to access the alternative streams of content (i.e. the title) via the Internet from a playback device such as (but not limited to) a user computer 18 or a mobile phone 20 and can commence streaming content. In several embodiments, the common cryptographic information is protected by encrypting at least a portion of the common cryptographic information using at least one encryption key. The playback device can securely obtain the cryptographic key using a process such as (but not limited to) Hypertext Transfer Protocol. Secure or HTTPS. Other processes for securely obtaining cryptographic information to obtain access to encrypted common cryptographic information in accordance with embodiments of the invention are discussed below.

In many embodiments, a playback device commences playback by requesting a top level index file from the content distribution server. The source encoder 12, the content distribution server 14, or another server can generate the top level index to the file(s) containing the streams, at least a plurality of which are alternative streams, at the time the request is made or at the time the streams are generated by the source encoder. The playback device can then use HTTP or another appropriate stateless protocol to request portions of the top level index file and the file(s) containing the protected streams via a network 16 such as the Internet.

In many embodiments, the top level index file is a SMIL file and the media is stored in Matroska container files. As is discussed further below, the media can be stored within the Matroska container file in a way that facilitates the protection of the content using common cryptographic information. In many embodiments, the Matroska container files are specialized Matroska container files that include enhancements (i.e. elements that do not form part of the Matroska file format specification) that facilitate retrieval and decryption using common cryptographic information of specific portions of media during adaptive bitrate streaming.

Although a specific content distribution system configured to support adaptive bitrate streaming is illustrated in FIG. 1A, any of a variety of content distribution system architectures can be utilized to implement an adaptive bitrate streaming system in accordance with embodiments of the invention. Source encoders, content distribution server systems, and playback devices in accordance with embodiments of the invention are discussed further below.

Source Encoders

Figure 1B:
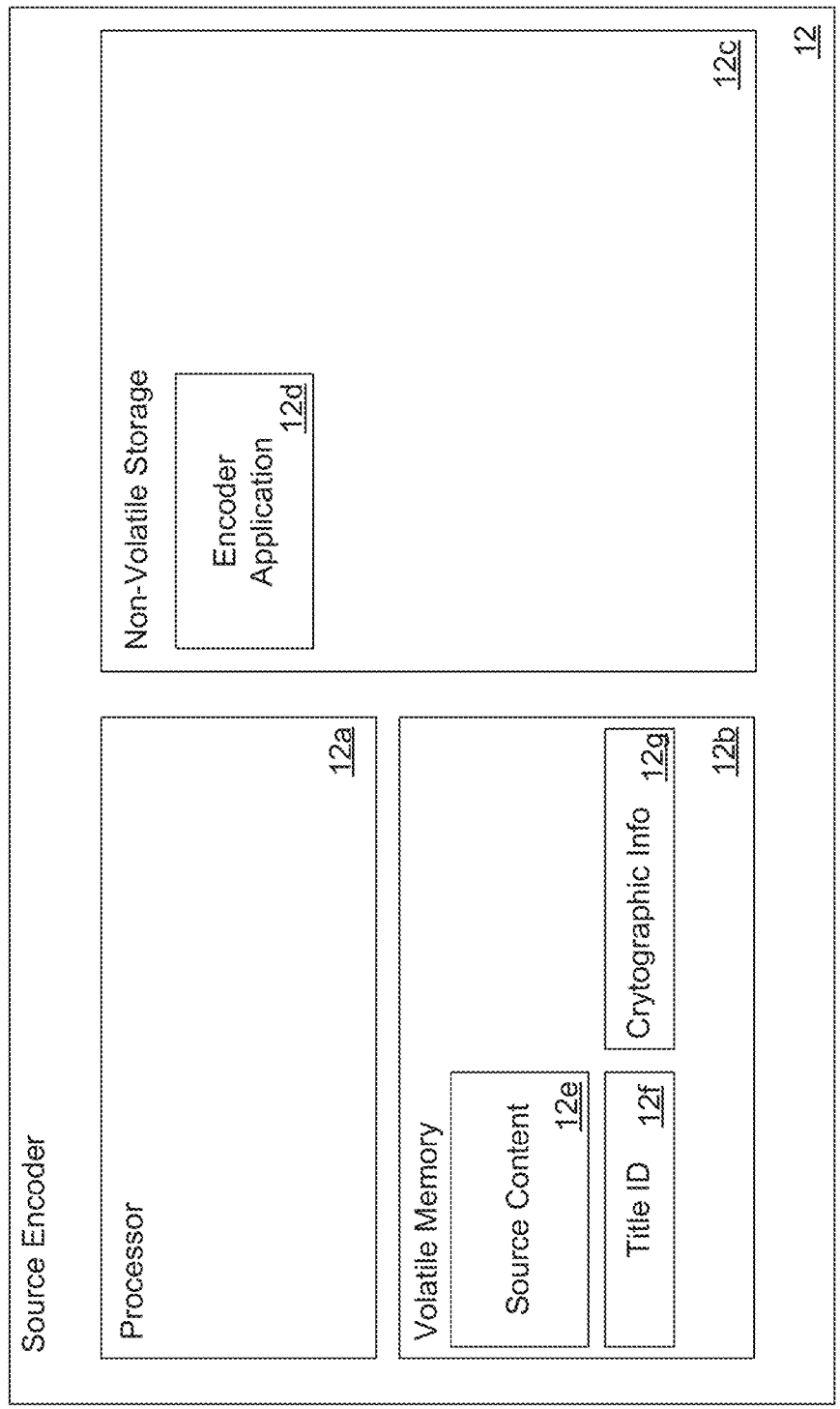
FIG. 1B is a block diagram illustrating a source encoder in accordance with an embodiment of the invention.

In many embodiments, a source encoder can be implemented using a server. In other embodiments, the source encoder can be any processing device including a processor and sufficient resources to perform the transcoding and encryption of source media (including but not limited to video, audio, and/or subtitles). A source encoder in accordance with an embodiment of the invention is illustrated in FIG. 1B. The source encoder 12 is implemented on a computing platform including a processor 12a, volatile memory 12b and non-volatile storage 12c. An encoder application 12d is stored in non-volatile storage 12c. The encoder application includes the machine readable instructions that configure the processor to encode source content 12e as a plurality of streams. In a number of embodiments, the encoder application also configures the source encoder to obtain common cryptographic information 12g that can be utilized to protect alternative streams generated using the source content 12e. In many embodiments, the source encoder obtains the common cryptographic information and a title ID from a content distribution system. In other embodiments, the source encoder generates a title ID and/or cryptographic data and provides the generated information to a content distribution system.

Although a specific source encoder in accordance with embodiments of the invention is illustrated in FIG. 1B, any of a variety of computing platforms can be utilized to implement a source encoder that is configured to encode at least one stream of source content as a plurality of alternative streams and to protect each of the alternative streams using common cryptographic information in accordance with embodiments of the invention.

Content Distribution Servers

Figure 1C:
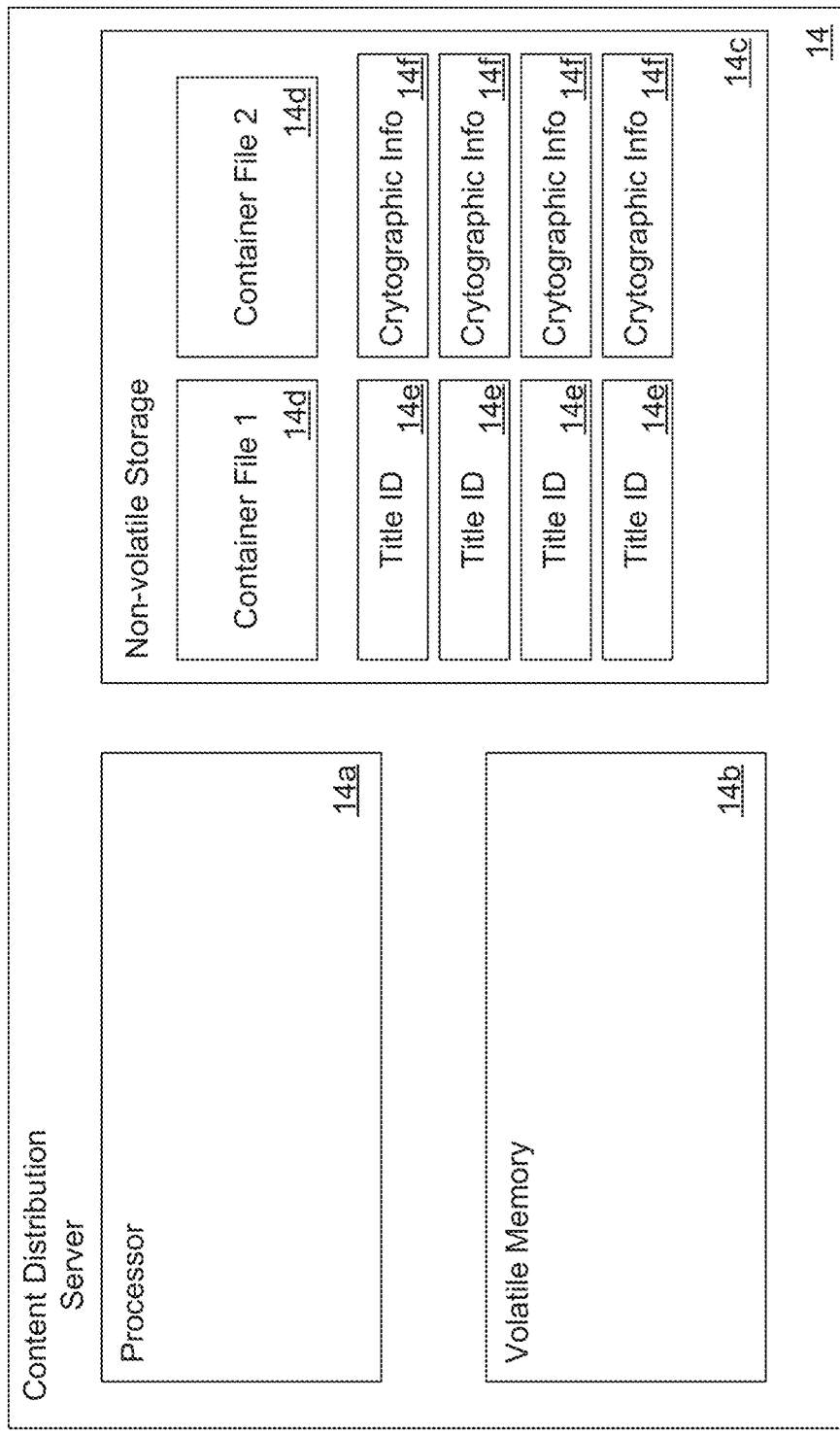
FIG. 1C is a block diagram illustrating a content distribution server in accordance with an embodiment of the invention.

Content distribution servers in accordance with embodiments of the invention can be responsible for storing protected streams of content for streaming to playback devices using adaptive bitrate streaming processes. Content distribution servers can also store common cryptographic information utilized to protect the alternative streams of protected content. In several embodiments, the common cryptographic information is identified utilizing a title ID associated with the common cryptographic information and a set of streams that form part of a specific title or piece of content. A content distribution server in accordance with an embodiment of the invention is illustrated in FIG. 1C. The content distribution server is implemented using a computing platform including a processor 14a, volatile memory 14b, and non-volatile storage 14c. In the illustrated embodiment, a plurality of container files 14d are stored on the content distribution server. Playback devices can stream content from the content distribution server utilizing adaptive bitrate streaming processes in accordance with embodiments of the invention. To facilitate the creation of new streams with respect to a specific piece of content, the content distribution server also stores title IDs 14e for specific pieces of content and common cryptographic information 14f associated with each title ID. A source encoder can request common cryptographic information to protect a new stream related to a specific piece of content, by providing a request to the content distribution server that identifies the specific piece of content using the title ID assigned to it.

Although a specific content distribution server is illustrated in FIG. 1C, any of a variety of computational platform including (but not limited to) platforms in which container files and common cryptographic information are stored on separate servers can be utilized in content distribution systems in accordance with embodiments of the invention.

Playback Devices

Figure 1D:
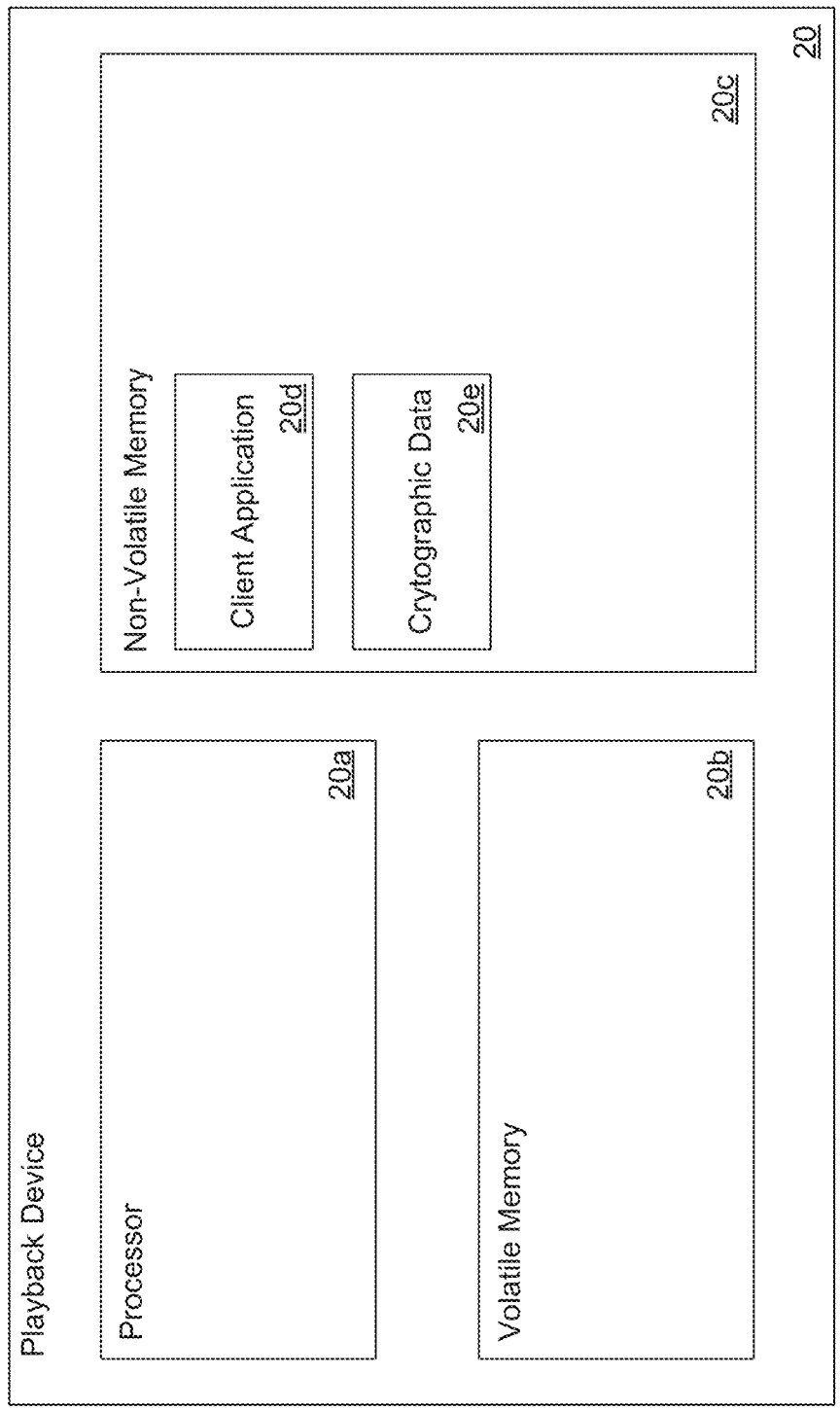
FIG. 1D is a block diagram illustrating a playback device in accordance with an embodiment of the invention.

Referring back to FIG. 1A, the illustrated playback devices include personal computers 18 and mobile phones 20. In other embodiments, playback devices can include consumer electronics devices such as DVD players, Blu-ray players, televisions, set top boxes, video game consoles, tablets, and other devices that are capable of playing back protected media stored on a content distribution server using adaptive bitrate streaming. A playback device in accordance with an embodiment of the invention is illustrated in FIG. 1D. The playback device is implemented on a processing platform 20 including a processor 20a, volatile memory 20b, and non-volatile memory (or other non-volatile storage) 20c. The non-volatile memory 20c contains a client application 20d, which includes machine readable instructions that can be utilized to configure the processor to register with a content distribution system to obtain cryptographic data 20e bound to the playback device. The playback device can then use the bound cryptographic data 20e to request adaptive bitrate streaming of protected content. As is discussed further below, the alternative streams of protected content utilized to perform adaptive bitrate streaming are protected using common cryptographic information. Once the client application 20d has obtained the common cryptographic information, which can be a time consuming and/or computationally intensive process, the playback device can use the same cryptographic information to access content in any of the alternative streams of protected content within a single instance of a title.

Although a specific architecture for a playback device is shown in FIG. 1D any of a variety of architectures can be utilized that enable playback devices to request portions of the top level index file and the container files in accordance with embodiments of the invention.

File Structure

Figure 2:
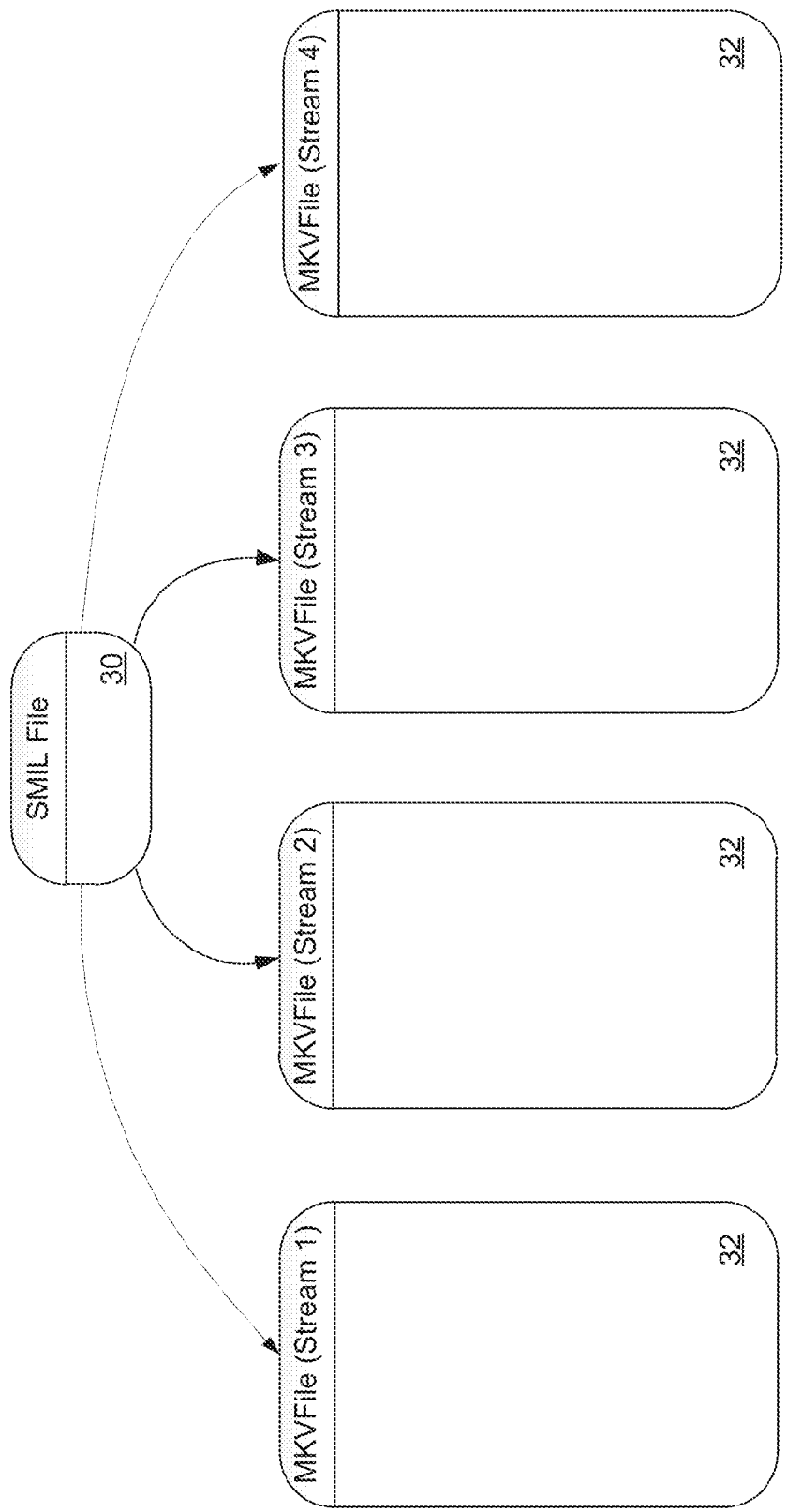
FIG. 2 conceptually illustrates a top level index file and Matroska container files generated by the encoding of source media in accordance with embodiments of the invention.

Files generated by a source encoder and/or stored on an HTTP server for streaming to playback devices in accordance with embodiments of the invention are illustrated in FIG. 2. The files utilized in the adaptive bitrate streaming of the source media include a top level index 30 and a plurality of container files 32 that each contain at least one stream. The top level index file describes the content of each of the container files. As is discussed further below, the top level index file can take a variety of forms including an SMIL file and the container files can take a variety of forms including a specialized Matroska container file.

In many embodiments, each Matroska container file contains a single protected stream. For example, the stream could be one of a number of alternate video streams protected using common cryptographic information, an audio stream, one of a number of alternate audio streams, a subtitle stream, one of a number of alternate subtitle streams, a trick play stream, or one of a number of alternate trick play streams protected using common cryptographic information. In several embodiments, the Matroska container file includes multiple multiplexed streams. For example, the Matroska container could include a video stream, and one or more audio streams, one or more subtitle streams, and/or one or more trick play streams. As is discussed further below, in many embodiments the Matroska container files are specialized files. The encoding of the media and the manner in which the media is stored within Cluster elements within the Matroska container file can be subject to constraints designed to enhance the performance of an adaptive bitrate streaming system. In a number of embodiments, common cryptographic information is included within a DRM header element in each of the Matroska container files and references to the common cryptographic information are made using DRMInfo elements included within BlockGroup elements of protected (not all frames need be protected to protect the stream). In addition, the Matroska container file can include index elements that facilitate the location and downloading of Cluster elements from the various Matroska container files during the adaptive streaming of the media. Top level index files and Matroska container files that can be used in adaptive bitrate streaming systems in accordance with embodiments of the invention are discussed below.

Top Level Index Files

Playback devices in accordance with many embodiments of the invention utilize a top level index file to identify the container files that contain the streams available to the playback device for use in adaptive bitrate streaming. In many embodiments, the top level index files can include references to container files that each include an alternative stream of encoded media. The playback device can utilize the information in the top level index file to retrieve encoded media from each of the container files according to the streaming conditions experienced by the playback device.

In several embodiments, the top level index file provides information enabling the playback device to retrieve information concerning the encoding of the media in each of the container files and an index to encoded media within each of the container files. In a number of embodiments, each container file includes information concerning the encoded media contained within the container file and an index to the encoded media within the container file and the top level index file indicates the portions of each container file containing this information. Therefore, a playback device can retrieve the top level index file and use the top level index file to request the portions of one or more of the container files that include information concerning the encoded media contained within the container file and an index to the encoded media within the container file. A variety of top level index files that can be utilized in adaptive bitrate streaming systems in accordance with embodiments of the invention are discussed further below.

In a number of embodiments, the top level index file utilized in the adaptive bitrate streaming of media is a SMIL file, which is an XML file that includes a list of URIs describing each of the streams and the container files that contain the streams. The URI can include information such as the "system-bitrate" of the stream contained within the stream and information concerning the location of specific pieces of data within the container file. The top level index SMIL file can be generated when the source media is encoded for playback via adaptive bitrate streaming. Alternatively, the top level index SMIL file can be generated when a playback device requests the commencement of playback of the encoded media. When the playback device receives the top level index SMIL file, the playback device can parse the SMIL file to identify the available streams. The playback device can then select the streams to utilize to playback the content and can use the SMIL file to identify the portions of the container file to download to obtain information concerning the encoding of a specific stream and/or to obtain an index to the encoded media within the container file.

Although top level index SMIL files are described above, any of a variety of top level index file formats can be utilized to create top level index files as appropriate to a specific application in accordance with an embodiment of the invention. The use of top level index files to enable playback of encoded media using adaptive bitrate streaming in accordance with embodiments of the invention is discussed further below.

Storing Protected Media in MKV Files for Adaptive Bitrate Streaming

Figure 3:
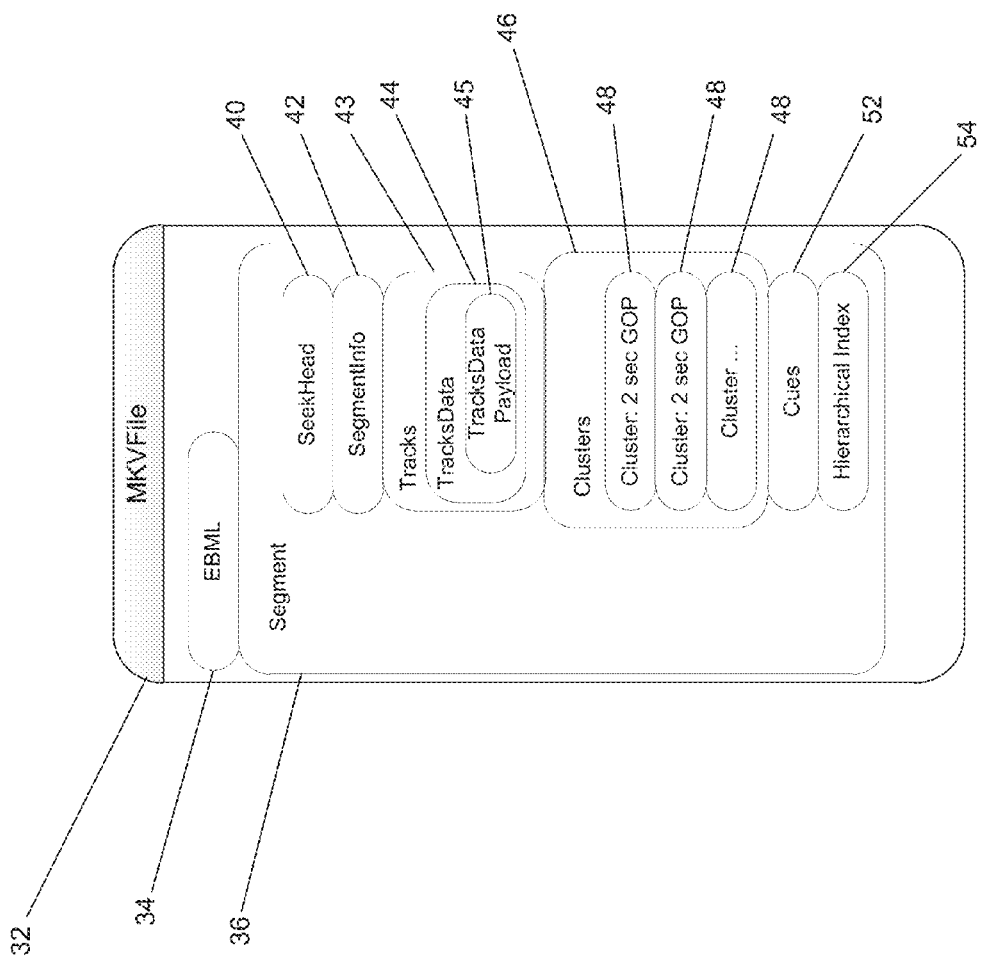
FIG. 3 conceptually illustrates a specialized Matroska container file incorporating a TracksData Payload containing cryptographic information in accordance with an embodiment of the invention.

A Matroska container file used to store encoded video in accordance with an embodiment of the invention is illustrated in FIG. 3. The container file 32 is an Extensible Binary Markup Language (EBML) file that is an extension of the Matroska container file format. The specialized Matroska container file 32 includes a standard EBML element 34, and a standard Segment element 36 that includes a standard Seek Head element 40, a standard Segment Information element 42, and a standard Tracks element 44 including a tracks data payload that is a non-standard EBML element containing cryptographic information utilized to access the protected streams) contained within the Matroska container file. In many embodiments, the cryptographic data takes the form of a DRMHeaders element (discussed below) that includes a set of keys utilized to access encrypted portions of the stream contained within the Matroska container file. In many embodiments, the set of keys is encrypted in such a way that a playback device can only access the set of keys in the clear using a specific piece or set of cryptographic information.

The Segment element 36 also includes a standard Clusters element 46. As is described below, the manner in which encoded media is inserted within individual. Cluster elements 48 within the Clusters element 46 is constrained to improve the playback of the media in an adaptive streaming system. In many embodiments, the constraints imposed upon the encoded video are consistent with the specification of the Matroska container file format and involve encoding the video so that each cluster includes at least one closed GOP commencing with an IDR frame. In addition to the above elements, the Segment element 36 can optionally include a modified version of the standard Cues element. As is discussed further below, the Cues element includes specialized CuePoint elements (i.e. non-standard CuePoint elements) that facilitate the retrieval of the media contained within specific Cluster elements via HTTP. The Segment element 36 can optionally include a non-standard Hierarchical. Index element 54. The Hierarchical. Index element is an extension to the Matroska file format proposed by DivX, LLC of San Diego, Calif. The Hierarchical. Index element is described in U.S. patent application Ser. No. 12/272,631, the disclosure of which is incorporated by reference above in its entirety.

The constraints imposed upon the encoding of media and the formatting of the encoded media within the Clusters element of a Matroska container file for adaptive bitrate streaming of protected streams and the additional. DRM and index information inserted within the container file in accordance with embodiments of the invention are discussed further below.

Encoding Media for Insertion in Cluster Elements

An adaptive bitrate streaming system provides a playback device with the option of selecting between different protected streams of encoded media during playback according to the streaming conditions experienced by the playback device. In many embodiments, switching between protected streams is facilitated by separately pre-encoding discrete portions of the source media in accordance with the encoding parameters of each stream and then including each separately encoded portion in its own Cluster element within the stream's container file. Furthermore, the media contained within each Cluster is encoded so that the media is capable of playback without reference to media contained in any other Cluster within the stream. In this way, each stream includes a Cluster element corresponding to the same discrete portion of the source media and, at any time, the playback device can select the Cluster element from the stream that is most appropriate to the streaming conditions experienced by the playback device and can commence playback of the media contained within the Cluster element. Accordingly, the playback device can select clusters from different streams as the streaming conditions experienced by the playback device change over time. In several embodiments, the Cluster elements are further constrained so that each Cluster element contains a portion of encoded media from the source media having the same duration. In a number of embodiments, each Cluster element includes two seconds of encoded media. The specific constraints applied to the media encoded within each Cluster element depending upon the type of media (i.e. video, audio, or subtitles) are discussed below.

Figures 4A, 4B:
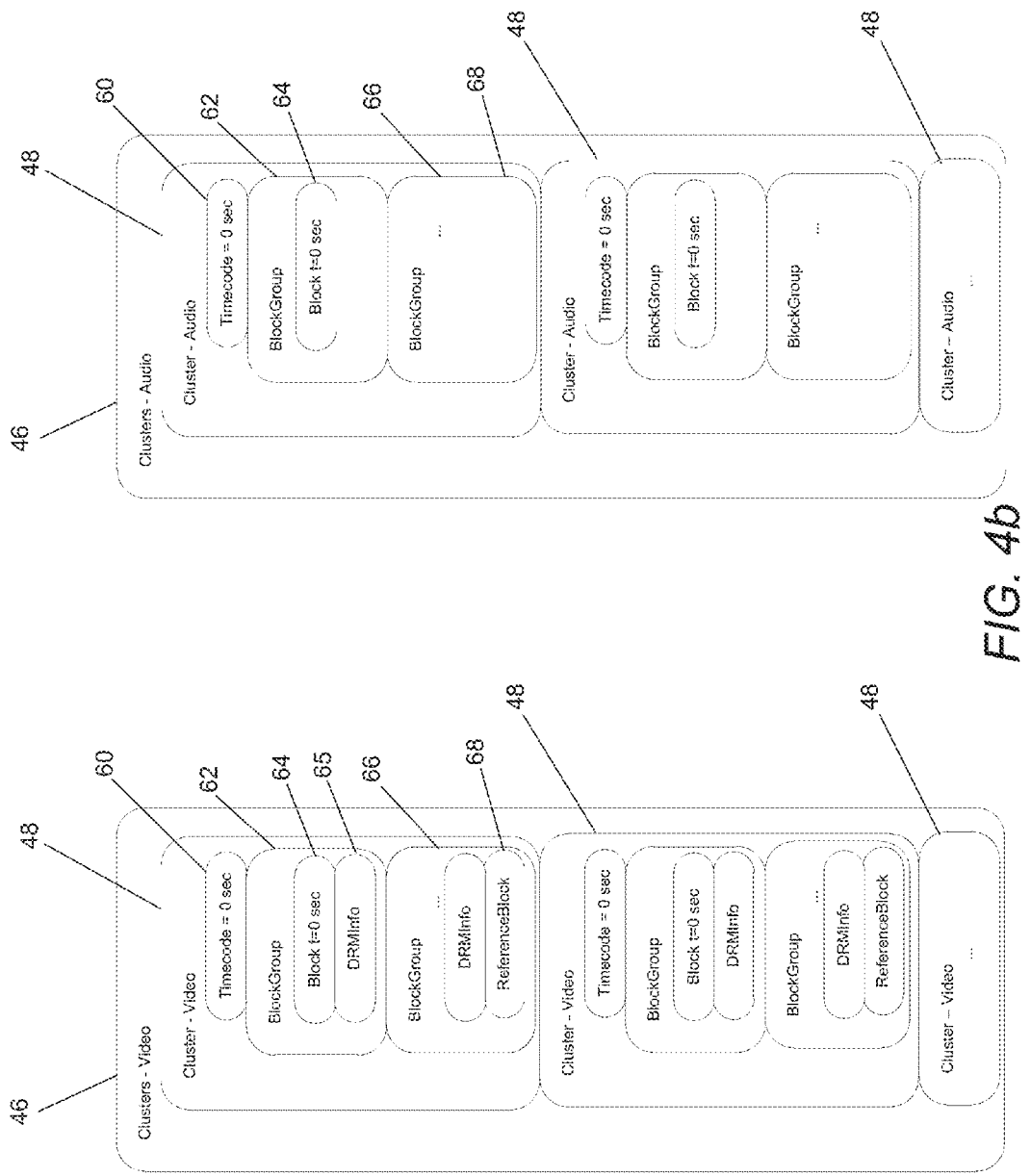

A Clusters element of a Matroska container file containing a video stream in accordance with an embodiment of the invention is illustrated in FIG. 4a. The Clusters element 46 includes a plurality of Cluster elements 48 that each contains a discrete portion of encoded video. In the illustrated embodiment, each Cluster element 48 includes two seconds of encoded video. In other embodiments, the Cluster elements include encoded video having a greater or lesser duration than two seconds. In several embodiments, the encoded video sequences in the Cluster elements have different durations.

Each Cluster element 48 includes a Timecode element 60 indicating the start time of the encoded video within the Cluster element and a plurality of BlockGroup elements. As noted above, the encoded video stored within the Cluster is constrained so that the encoded video can be played back without reference to the encoded video contained within any of the other Cluster elements in the container file. In many embodiments, encoding the video contained within the Cluster element as a GOP in which the first frame is an IDR frame enforces the constraint. In the illustrated embodiment, the first BlockGroup element 62 contains an IDR frame. Therefore, the first BlockGroup element 62 does not include a ReferenceBlock element. The first BlockGroup element 62 includes a Block element 64, which specifies the Timecode attribute of the frame encoded within the Block element 64 relative to the Timecode of the Cluster element 48 and a DRMInfo element 65 that identifies a portion of the frame that is encrypted and the cryptographic information that can be utilized to access the encrypted portion of the frame. In a number of embodiments, only a small portion of the video frame is encrypted and the DRMInfo includes a reference to the start of an encrypted block of data and the size of the encrypted block of data. As is discussed further below, the common cryptographic information utilized to protect alternative streams of video content is a set of frame keys in many embodiments of the invention and the DRMInfo element can also include an index to a specific frame key in the set of frame keys that can be utilized to access the encrypted block of data in the clear. In other embodiments, any of a variety of information appropriate to identifying encrypted data within a video frame and decrypting the encrypted data can be stored within a DRMInfo element.

Subsequent BlockGroup elements 66 are not restricted in the types of frames that they can contain (other than that they cannot reference frames that are not contained within the Cluster element). Therefore, subsequent BlockGroup elements 66 can include ReferenceBlock elements 68 referencing other BlockGroup elements) utilized in the decoding of the frame contained within the BlockGroup or can contain IDR frames and are similar to the first BlockGroup element 62. In addition, subsequent BlockGroup elements 66 can also include DRMInfo elements to describe the manner in which the frame of video contained within the BlockGroup element is protected. As noted above, the manner in which encoded video is inserted within the Cluster elements of the Matroska file conforms with the specification of the Matroska file format.

The insertion of encoded audio and subtitle information within a Clusters element 46 of a Matroska container file in accordance with embodiments of the invention is illustrated in FIGS. 4b and 4c. In the illustrated embodiments, the encoded media is inserted within the Cluster elements 48 subject to the same constraints applied to the encoded video discussed above with respect to FIG. 4a. In addition, the duration of the encoded audio and subtitle information within each Cluster element corresponds to the duration of the encoded video in the corresponding Cluster element of the Matroska container file containing the encoded video. In other embodiments, the Cluster elements within the container files containing the audio and/or subtitle streams need not correspond with the start time and duration of the Cluster elements in the container files containing the alternative video streams. In many embodiments, audio, and/or subtitle tracks are protected and information identifying the protected portions of the stream can be included in an element in a manner similar to that described above with respect to protected video streams.

Multiplexing Streams in a Single MKV Container File

The Clusters elements shown in FIGS. 4a-4c assume that a single stream is contained within each Matroska container file. In several embodiments, media from multiple streams is multiplexed within a single Matroska container file. In this way, a single container file can contain a video stream multiplexed with one or more corresponding audio streams, and/or one or more corresponding subtitle streams. Storing the streams in this way can result in duplication of the audio and subtitle streams across multiple alternative video streams. However, the seek time to retrieve encoded media from a video stream and an associated audio, and/or subtitle stream can be reduced due to the adjacent storage of the data on the server. The Clusters element 46 of a Matroska container file containing multiplexed video, audio and subtitle data in accordance with an embodiment of the invention is illustrated in FIG. 4d. In the illustrated embodiment, each Cluster element 48 includes additional. BlockGroup elements for each of the multiplexed streams. The first Cluster element includes a first BlockGroup element 62v for encoded video that includes a Block element 64v containing an encoded video frame and indicating the Timecode attribute of the frame relative to the start time of the Cluster element (i.e. the Timecode attribute 60). A second BlockGroup element 62a includes a Block element 64a including an encoded audio sequence and indicating the timecode of the encoded audio relative to the start time of the Cluster element, and a third BlockGroup element 62s including a Block element 64s containing an encoded subtitle and indicating the timecode of the encoded subtitle relative to the start time of the Cluster element. In the illustrated embodiment, only the video stream is protected. Therefore, the BlockGroup elements 62v containing the video stream include DRMInfo elements 65v to identify the portions of the frames within the video stream that are encrypted. In other embodiments, the audio, and/or subtitle streams can also be protected. Although not shown in the illustrated embodiment, each Cluster element 48 likely would include additional. BlockGroup elements containing additional encoded video, audio or subtitles. Despite the multiplexing of the encoded video, audio, and/or subtitle streams, the same constraints concerning the encoded media apply.

Incorporating Trick Play Streams in MKV Container Files for Use in Adaptive Bitrate Streaming Systems The incorporation of trick play tracks within Matroska container files is proposed by DivX, LLC in U.S. patent application Ser. No. 12/260,404 entitled "Application Enhancement Tracks", filed Oct. 29, 2008, the disclosure of which is hereby incorporated by reference in its entirety. Trick play tracks similar to the trick play tracks described in U.S. patent application Ser. No. 12/260,404 can be used to provide a trick play stream in an adaptive bitrate streaming system in accordance with an embodiment of the invention to provide smooth visual search through source content encoded for adaptive bitrate streaming. A separate trick play stream can be encoded that appears to be an accelerated visual search through the source media when played back, when in reality the trick play stream is simply a separate stream encoding the source media at a lower frame rate. In several embodiments, a trick play stream is generated in the manner outlined in U.S. patent application Ser. No. 12/260,404 and inserting the trick play stream into a Matroska container file subject to the constraints mentioned above with respect to insertion of a video stream into a Matroksa container file. In many embodiments, the trick play stream is also subject to the further constraint that every frame in the GOP of each Cluster element in the trick play stream is encoded as an IDR frame. As with the other video streams, each Cluster element contains a GOP corresponding to the same two seconds of source media as the corresponding Cluster elements in the other streams. There are simply fewer frames in the GOPs of the trick play stream and each frame has a longer duration. In this way, transitions to and from a trick play stream can be treated in the same way as transitions between any of the other encoded streams are treated within an adaptive bitrate streaming system in accordance with embodiments of the invention. In embodiments where the trick play streams) are protected, the same common cryptographic information utilized to encrypt the primary video streams) is utilized to protect the trick play stream(s). Playback of the frames contained within the trick play stream to achieve accelerated visual search typically involves the playback device manipulating the timecodes assigned to the frames of encoded video prior to providing the frames to the playback device's decoder to achieve a desired increase in rate of accelerated search (e.g. ×2, ×4, ×6, etc.).

Figure 4E:
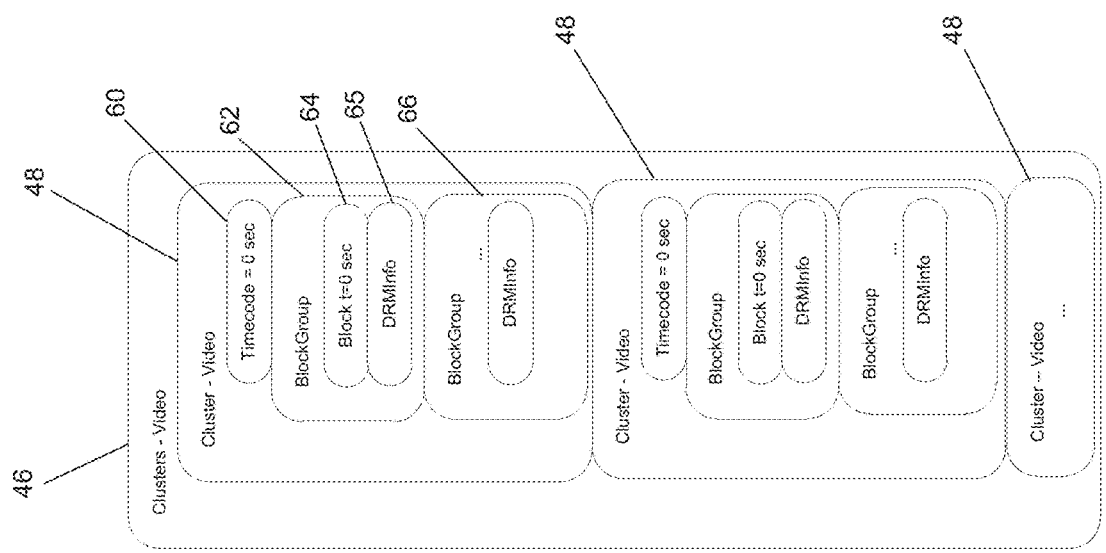
FIG. 4e conceptually illustrates the inclusion of a protected trick play track into the Clusters element of a Matroska container file subject to various constraints that facilitate adaptive bitrate streaming in accordance with an embodiment of the invention.

A Clusters element containing encoded media from a trick play stream is shown in FIG. 4e. In the illustrated embodiment, the encoded trick play stream is inserted within the Cluster elements 48 subject to the same constraints applied to the encoded video discussed above with respect to FIG. 4a including the constraint that frames are protected using the common cryptographic information. However, each BlockGroup element contains an IDR. In other embodiments, the Cluster elements within the container files containing the trick play streams need not correspond with the start time and duration of the Cluster elements in the container files containing the alternative video streams.

In many embodiments, source content can be encoded to provide a single trick play stream or multiple trick play streams for use by the adaptive bit rate streaming system. When a single trick play stream is provided, the trick play stream is typically encoded at a low bitrate. When multiple alternative trick play streams are provided, adaptive streaming can also be performed with respect to the trick play streams. In several embodiments, multiple trick play streams are provided to support different rates of accelerated visual search through the encoded media.

Incorporating Indexing Information within MKV Container Files

Figure 5:
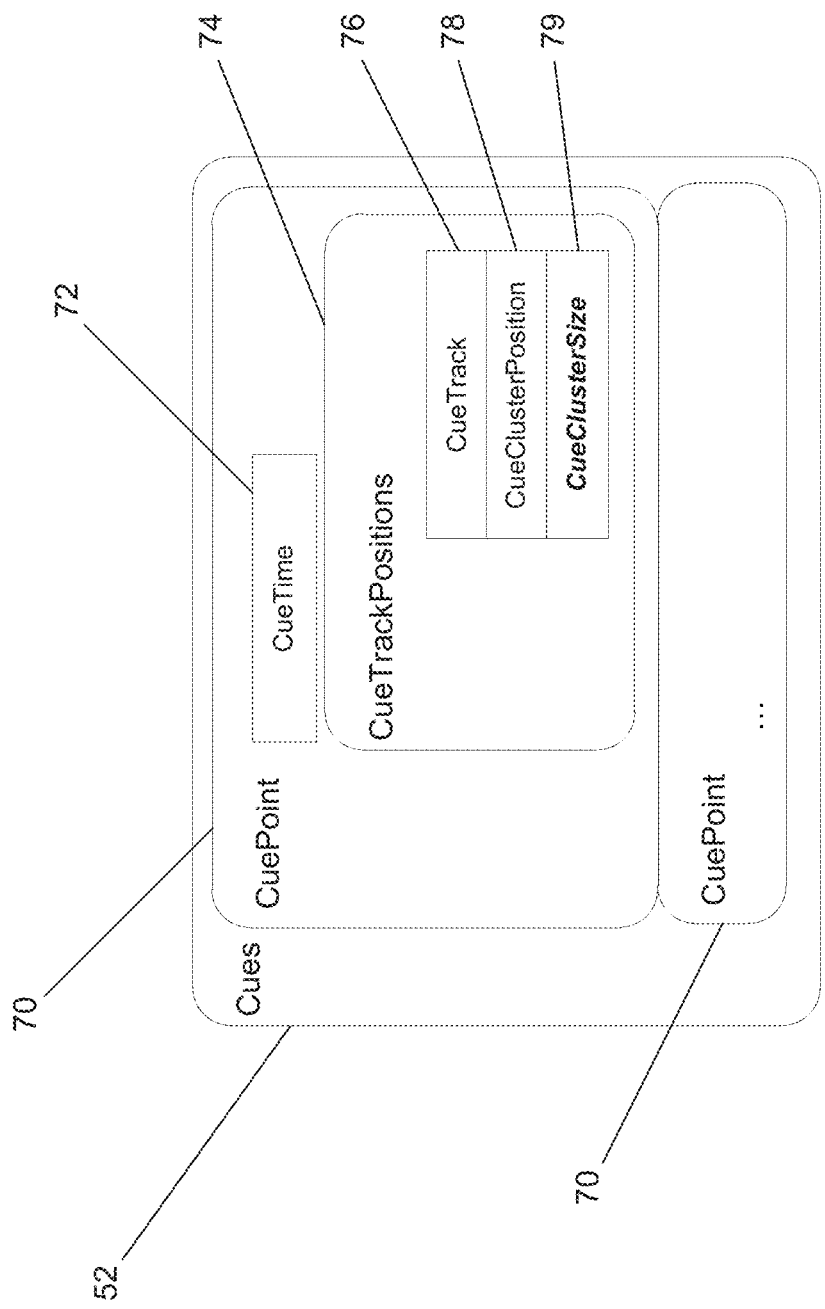
FIG. 5 conceptually illustrates a modified Cues element of a specialized Matroska container file, where the Cues element includes information enabling the retrieval of Cluster elements using HTTP byte range requests in accordance with an embodiment of the invention.

The specification for the Matroska container file format provides for an optional. Cues element that is used to index Block elements within the container file. A modified Cues element that can be incorporated into a Matroska container file in accordance with an embodiment of the invention to facilitate the requesting of clusters by a playback device using HTTP is illustrated in FIG. 5. The Cues element 52 is similar to a standard Cues element 52 in that it includes a plurality of standard CuePoint elements 70 that each include a standard CueTime attribute 72. Each CuePoint element includes a CueTrackPositions element 74 containing the standard CueTrack 76 and CueClusterPosition 78 attributes. In many embodiments, the CuePoint element is mainly configured to identify a specific Cluster element as opposed to a specific Block element within a Cluster element. Although, in several applications the ability to seek to specific Block elements within a Cluster element is required and additional index information is included in the Cues element.

Figure 6:
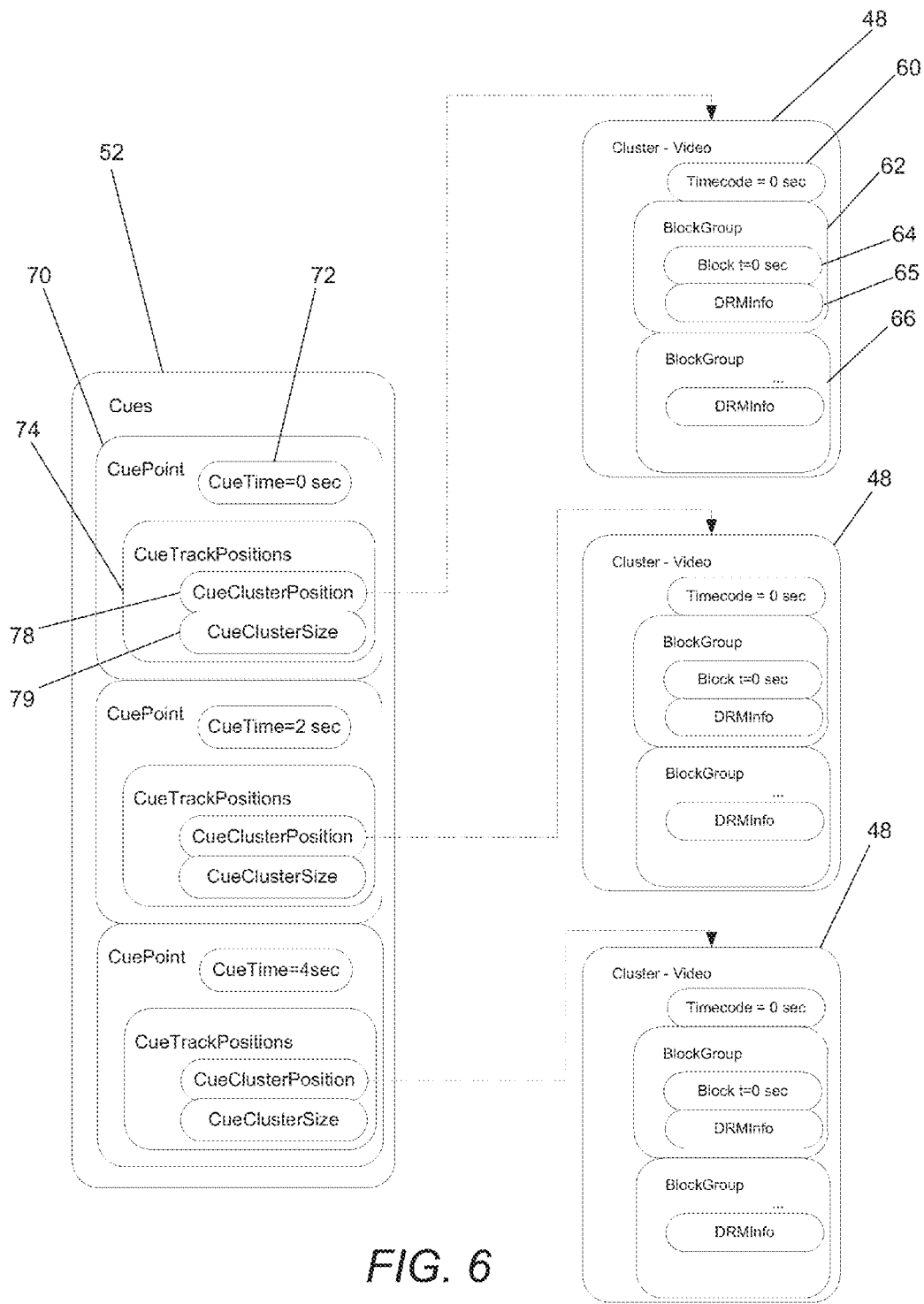
FIG. 6 conceptually illustrates the indexing of Cluster elements within a specialized Matroska container file utilizing modified CuePoint elements within the container file in accordance with embodiments of the invention.

The use of a modified Cues element to index encoded media within a Clusters element of a Matroska file in accordance with an embodiment of the invention is illustrated in FIG. 6. A CuePoint element is generated to correspond to each Cluster element within the Matroska container file. The CueTime attribute 72 of the CuePoint element 70 corresponds to the Timecode attribute 60 of the corresponding Cluster element 48. In addition, the CuePoint element contains a CueTrackPositions element 74 having a CueClusterPosition attribute 78 that points to the start of the corresponding Cluster element 48. The CueTrackPositions element 74 can also include a CueBlockNumber attribute, which is typically used to indicate the Block element containing the first IDR frame within the Cluster element 48.

As can readily be appreciated the Cues element 52 forms an index to each of the Cluster elements 48 within the Matroska container file. Furthermore, the CueTrackPosition elements provide information that can be used by a playback device to request the byte range of a specific Cluster element 48 via HTTP or another suitable protocol from a remote server. The Cues element of a conventional. Matroska file does not directly provide a playback device with information concerning the number of bytes to request from the start of the Cluster element in order to obtain all of the encoded video contained within the Cluster element. The size of a Cluster element is, therefore, inferred by using the CueClusterPosition attribute of the CueTrackPositions element that indexes the first byte of the next Cluster element. Alternatively, additional. CueTrackPosition elements could be added that index the last byte of the Cluster element (in addition to the CueTrackPositions elements that index the first byte of the Cluster element), and/or a non-standard CueClusterSize attribute that specifies the size of the Cluster element pointed to by the CueClusterPosition attribute is included in each CueTrackPosition element to assist with the retrieval of specific Cluster elements within a Matroska container file via HTTP byte range requests or a similar protocol.

The modification of the Cues element in the manner outlined above significantly simplifies the retrieval of Cluster elements from a Matroska container file via HTTP or a similar protocol during adaptive bitrate streaming. In addition, by only indexing the first frame in each Cluster the size of the index is significantly reduced. Given that the index is typically downloaded prior to playback, the reduced size of the Cues element (i.e. index) means that playback can commence more rapidly. Using the CueClusterPosition elements, a playback device can request a specific Cluster element from the stream most suited to the streaming conditions experienced by the playback device by simply referencing the index of the relevant Matroska container file using the Timecode attribute for the desired Cluster element.

Figure 5A:
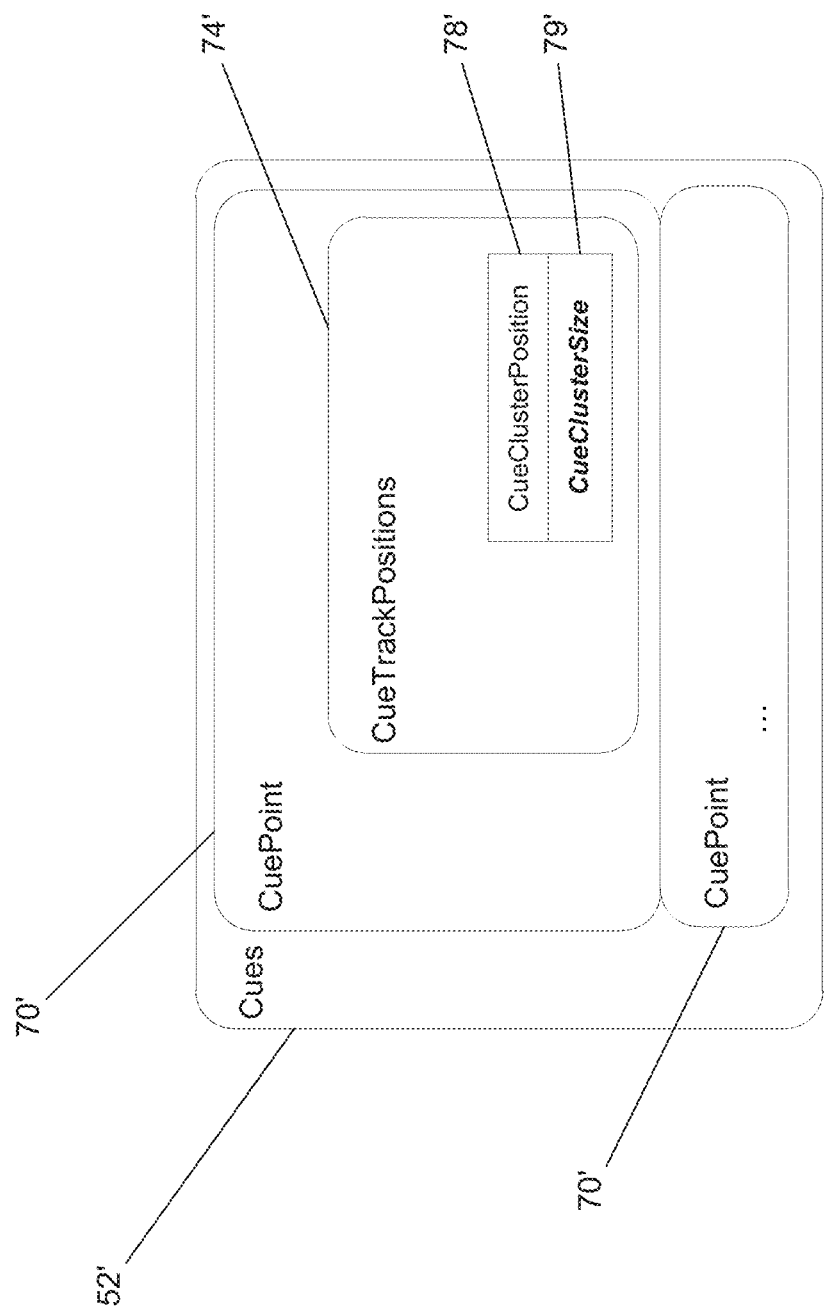
FIG. 5a conceptually illustrates a modified Cues element of a specialized Matroska container file in accordance with an embodiment of the invention, where the Cues element is similar to the Cues element shown in FIG. 5 with the exception that attributes that are not utilized during adaptive bitrate streaming are removed.

A number of the attributes within the Cues element are not utilized during adaptive bitrate streaming. Therefore, the Cues element can be further modified by removing the unutilized attributes to reduce the overall size of the index for each Matroska container file. A modified Cues element that can be utilized in a Matroska container file that includes a single encoded stream, where portions of the encoded stream having the same duration are contained in each Cluster element within the Matroska file in accordance with an embodiment of the invention is illustrated in FIG. 5a. The Cues element 52' shown in FIG. 5a is similar to the Cues element 52 shown in FIG. 5 with the exception that the CuePoint elements 70' do not include a CueTime attribute (see 72 in FIG. 5) and/or the CueTrackPositions elements 74' do not include a CueTrack attribute (76 in FIG. 5). When the portions of encoded media in each Cluster element in the Matroska container file have the same duration, the CueTime attribute is not necessary. When the Matroska contain file includes a single encoded stream, the CueTrack attribute is not necessary. In other embodiments, the Cues element and/or other elements of the Matroska container file can be modified to remove elements and/or attributes that are not necessary for the adaptive bitrate streaming of the encoded stream contained within the Matroska container file, given the manner in which the stream is encoded and inserted in the Matroska container file.

Although various modifications to the Cues element to include information concerning the size of each of the Cluster elements within a Matroska container file and to eliminate unnecessary attributes are described above, many embodiments of the invention utilize a conventional. Matroska container. In several embodiments, the playback device simply determines the size of Cluster elements on the fly using information obtained from a conventional. Cues element, and/or relies upon a separate index file containing information concerning the size and/or location of the Cluster elements within the MKV container file. In several embodiments, the additional index information is stored in the top level index file. In a number of embodiments, the additional index information is stored in separate files that are identified in the top level index file. When index information utilized to retrieve Cluster elements from a Matroska container file is stored separately from the container file, the Matroska container file is still typically constrained to encode media for inclusion in the Cluster elements in the manner outlined above. In addition, wherever the index information is located, the index information will typically index each Cluster element and include (but not be limited to) information concerning at least the starting location and, in many instances, the size of each Cluster element.

Incorporating Hierarchical Indexes into MKV Containers

Retrieval of media using HTTP during adaptive streaming can be improved by adding additional index information to the Matroska container files used to contain each of the encoded streams. In a number of embodiments, the index is a reduced index in that the index only points to the IDRs at the start of each cluster. In many embodiments, the index of the Matroska container file includes additional non-standard attributes (i.e. attributes that do not form part of the Matroska container file format specification) that specify the size of each of the clusters so that a playback device can retrieve a Cluster element from the Matroska container file via HTTP using a byte range request. In several embodiments, the Matroska container file includes a hierarchical index using a HierarchicalIndex element similar to the hierarchical indexes disclosed in U.S. patent application Ser. No. 12/272,631 entitled "Hierarchical and Reduced Index Structures for Multimedia Files" to Soroushian et al filed Nov. 17, 2008 to increase the speed with which a playback device can seek to a specific Cluster element containing encoded media within the container file. The disclosure of U.S. patent application Ser. No. 12/272,631 is hereby incorporated by reference in its entirety.

Figure 7:
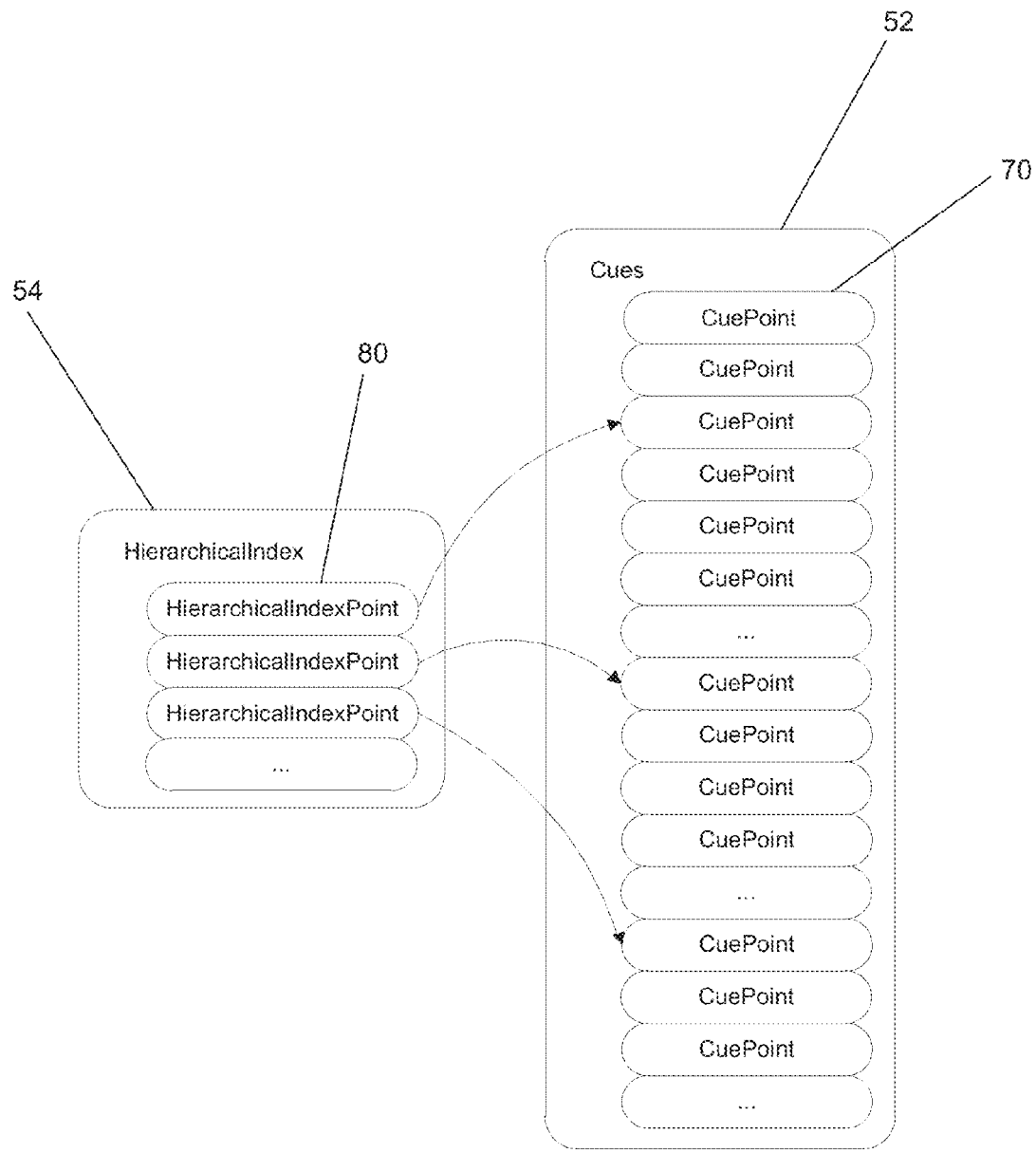
FIG. 7 conceptually illustrates the use of a hierarchical index to index CuePoint elements within a Matroska container file in accordance with embodiments of the invention.

A hierarchical index included in a Matroska container file using a HierarchicalIndex element in accordance with an embodiment of the invention is illustrated in FIG. 7. The HierarchicalIndex element 54 includes a plurality of HierarchicalIndexPointer elements 80 that each point to a CuePoint element 70 within the Cues element 52. In this way, the hierarchical index can be utilized to rapidly locate specific Cluster elements within a Matroska file using the Timecode attribute of the Cluster element. Furthermore, the entire index (i.e. the entire Cues element) need not be downloaded in order to locate a specific Cluster element. The playback device can simply download the hierarchical index and download the specific CuePoint elements that enable the location of a desired Cluster element within the Matroska container file.

In several embodiments, the HierarchicalIndex element is generated so that the HierarchicalIndexPointer elements point to CuePoint elements indexing Cluster elements that are a predetermined time period apart. For example, the HierarchicalIndexPointer elements can point to CuePoint elements indexing Cluster elements that are spaced 30 seconds apart. In other implementations, any of a variety of implementations can be utilized to determine the interval between the CuePoint elements referenced by the higher layers of the hierarchical index. In addition, although a two layer hierarchical index is illustrated in FIG. 7, hierarchical indexes including three or more layers can also be incorporated within Matroska container files generated for use in adaptive bitrate streaming systems in accordance with embodiments of the invention.

As noted above, index information can be stored in a separate file to the Matroska container file in accordance with embodiments of the invention. In embodiments where the index information is stored separately, the index can be hierarchical to prevent the need to download the entire index for a container file prior to playback and to facilitate seeking within the index.

Encoding and Protecting Source Media for Adaptive Bitrate Streaming

Figure 8:
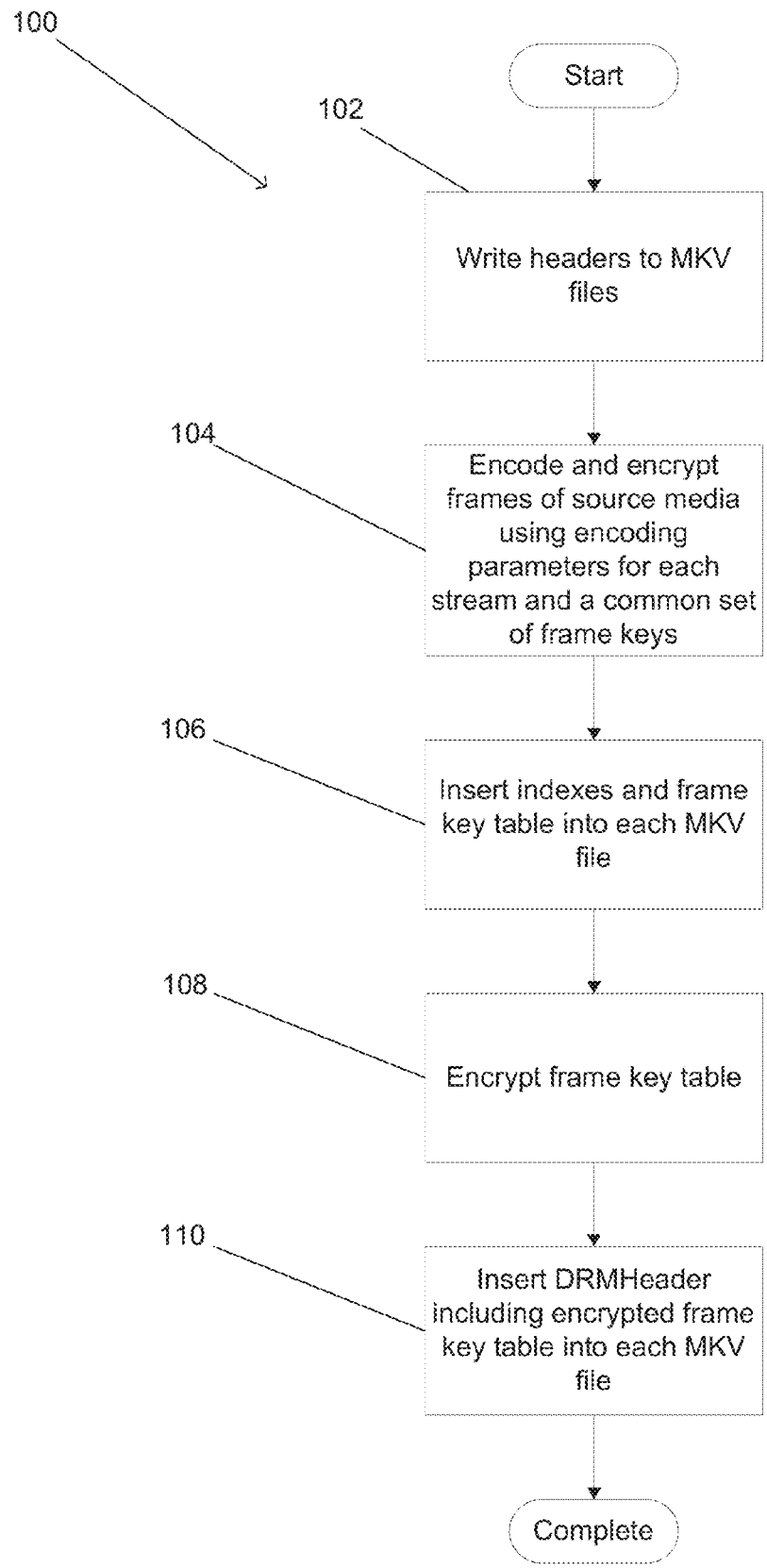
FIG. 8 is a flow chart illustrating a process for encoding and protecting source media for adaptive bitrate streaming in accordance with an embodiment of the invention.

A process for encoding source media as a top level index file and a plurality of Matroska container files for use in an adaptive bitrate streaming system in accordance with an embodiment of the invention is illustrated in FIG. 8. The encoding process 100 commences by writing headers for each of the MKV files that will contain the streams of content generated using the source content. In the illustrated embodiment, the source content includes a stream of video that is encoded as a plurality of protected streams. The frames of the source video are encoded (104) using the encoding parameters associated with each of the alternative streams and portions of the encoded frames can be encrypted using a frame key selected from a set of frame keys. When the encoding and encryption of the streams is complete, an index is inserted (106) into each Matroska container file containing an alternative stream of protected video. The common set of frame keys is also encrypted (108) and the process writes (110) a DRM header including the encrypted set of frame keys to each container file. DRM headers and processes for restricting access to cryptographic information stored within the DRM header of a Matroska container file in accordance with embodiments of the invention are discussed further below.

Figure 9:
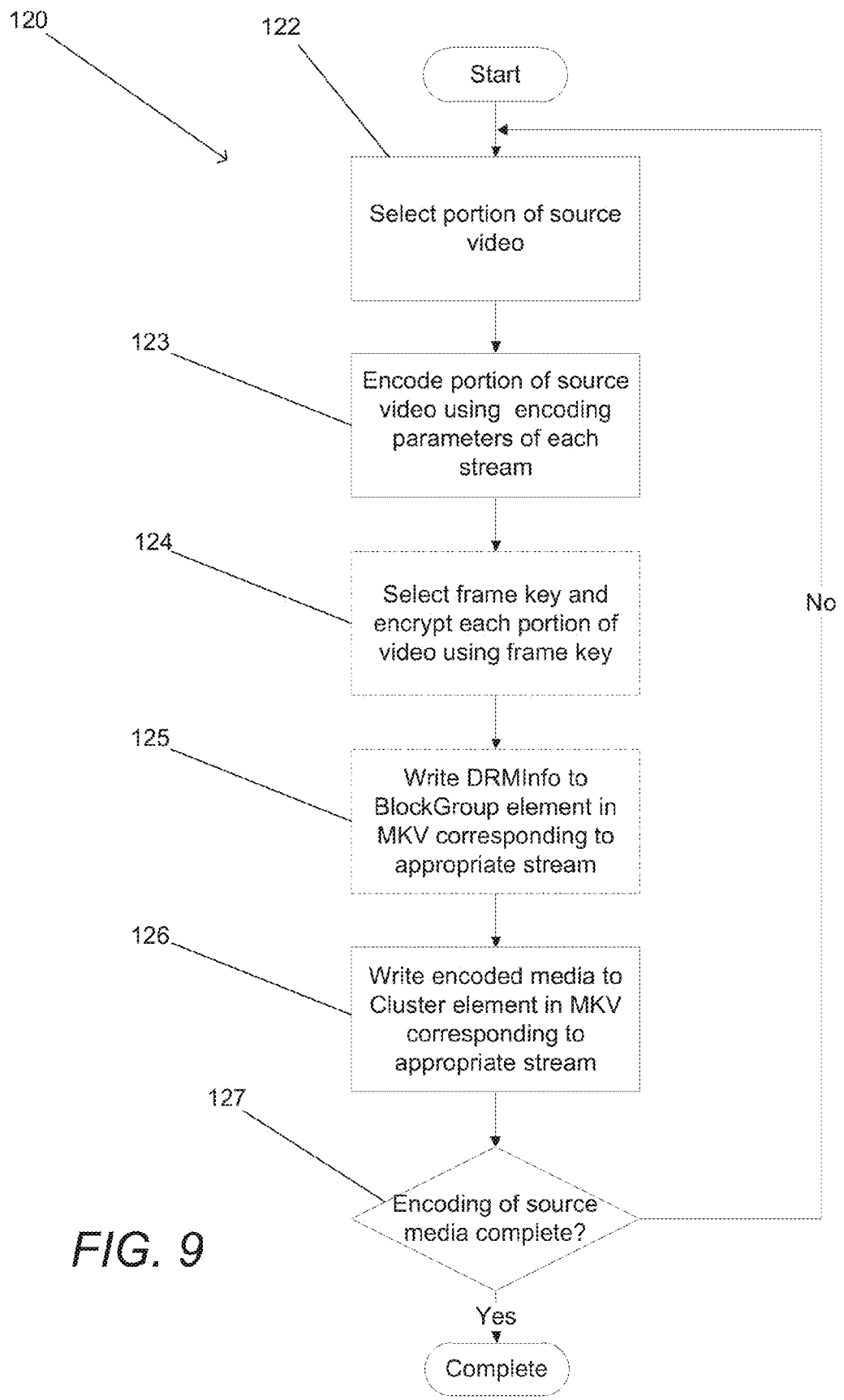
FIG. 9 is a flow chart illustrating a process for encoding and encrypting frames of source video in accordance with an embodiment of the invention.

A process for encoding and protecting frames of video to create a plurality of alternative streams of protected video in accordance with embodiments of the invention is illustrated in FIG. 9. The process 120 includes selecting (122) a first portion of the source media and encoding (123) the source media using the encoding parameters for each alternative stream. Assuming that the resulting frame is to be encrypted, a frame key can be selected (124) from a common set of frame keys and utilized to encrypt at least a portion of the frame of video. A DRMInfo element can then be written (125) to a BlockGroup element. The DRMInfo element identifies the portion of the frame that is encrypted and the frame key that can be utilized by a playback device to access the encrypted portion of the frame. The encoded and/or encrypted frame can then be written (126) to the BlockGroup element. When the entire source video stream is determined (127) as being encoded and protected, then the process is complete.

Each portion of source video that is encoded (123) can be encoded as a single GOP commencing with an IDR frame. In many embodiments, encoding parameters used to create the alternative GOPs vary based upon bitrate, frame rate, encoding parameters and resolution. In this way, the portion of media is encoded as a set of interchangeable alternatives and a playback device can select the alternative most appropriate to the streaming conditions experienced by the playback device. When different resolutions are supported, the encoding of the streams is constrained so that each stream has the same display aspect ratio. A constant display aspect ratio can be achieved across different resolution streams by varying the sample aspect ratio with the resolution of the stream. In many instances, reducing resolution can result in higher quality video compared with higher resolution video encoded at the same bit rate.

Although specific processes involving the encoding and protection of a source video stream as a set of alternative streams are illustrated in FIGS. 8 and 9, any of a variety of processes can be utilized to protect audio, video, and/or subtitle streams using common cryptographic information in accordance with embodiments of the invention. Following the encoding of the source media to create Matroska container files containing each of the protected streams, which can include trick play streams, the Matroska container files can be uploaded to a content distribution server for adaptive bitrate streaming to playback devices. The adaptive bitrate streaming of protected media encoded in accordance with embodiments of the invention using HTTP requests is discussed further below.

DRM Headers

Figure 10:
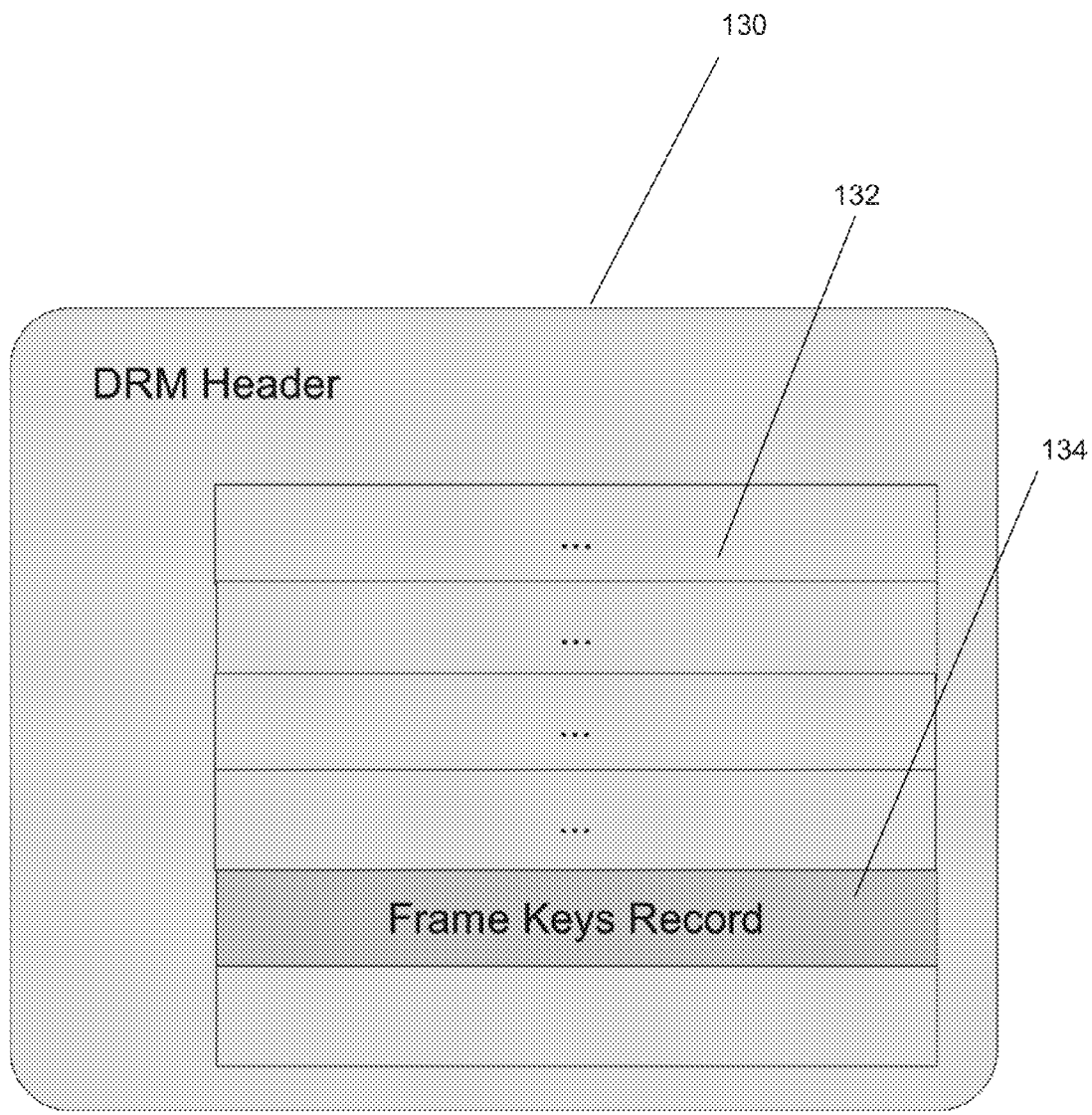
FIG. 10 conceptually illustrates a DRM header element that can be included in a Matroska container file in accordance with an embodiment of the invention.

Common cryptographic information utilized in protecting alternative streams can be inserted into container files containing each of the alternative streams. When the container files are Matroska container files, the common cryptographic information can be inserted into the container file as a DRMHeader element. A DRMHeader element configured to contain a set of keys in accordance with an embodiment of the invention is illustrated in FIG. 10. The DRM Header element 130 includes a plurality of pieces of information 132 including a frame keys record 134 that can be utilized to contain a set of frame keys or frame key table common to each of a plurality of alternative streams.

If the frame key record 134 is communicated in the clear, then any playback device can access the protected streams. Therefore, the frame keys record 134 is typically encrypted using one or more encryption keys. The encryption key(s) used to encrypt the frame key record 134 can be securely provided to an individual playback device using any of a variety of techniques appropriate to a specific application. In the context of streaming systems that also support the downloading of content.

Although a specific format for storing common cryptographic information in a Matroska container file is illustrated in FIG. 10, any format can be utilized to store common cryptographic information in a Matroska container file and/or any other container file appropriate to a specific application in accordance with an embodiment of the invention. Adaptive bitrate streaming of protected content in accordance with embodiments of the invention is discussed further below.

Adaptive Bitrate Streaming from MKV Container Files Using Http

When source media is encoded so that there are alternative streams of protected media contained in separate Matroska container files for at least one of video, audio, and subtitle content, adaptive streaming of the media contained within the Matroska container files can be achieved using HTTP requests or a similar stateless data transfer protocol. In many embodiments, a playback device requests a top level index file from a content distribution server and uses the index information to identify the streams that are available to the playback device and the cryptographic information required to access any protected streams. The playback device can then retrieve the indexes for one or more of the Matroska files and can use the indexes to request media from one or more of the protected streams contained within the Matroska container files using HTTP requests or using a similar stateless protocol. As noted above, many embodiment of the invention implement the indexes for each of the Matroska container files using a modified Cues element. In several embodiments, the index is a hierarchical index and is also includes a HierarchicalIndex element contained within the Matroska container file. In a number of embodiments, however, the encoded media for each stream is contained within a standard Matroska container file and separate index file(s) can also be provided for each of the container files.

Based upon the streaming conditions experienced by the playback device, the playback device can select media from alternative protected streams encoded at different bitrates. When the media from each of the streams is protected using common cryptographic information and inserted into the Matroska container files in the manner outlined above, transitions between streams can occur upon the completion of playback of media within a Cluster element without the need to retrieve additional cryptographic information. As noted above, the size of the Cluster elements (i.e the duration of the encoded media within the Cluster elements) is typically chosen so that the playback device is able to respond quickly enough to changing streaming conditions and to instructions from the user that involve utilization of a trick play track. The smaller the Cluster elements (i.e. the smaller the duration of the encoded media within each Cluster element) the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In many embodiments, the size of the Cluster elements is chosen so that each Cluster element contains two seconds of encoded media. In other embodiments, the duration of the encoded media can be greater or less than two seconds and/or the duration of the encoded media can vary from Cluster element to Cluster element.

Figure 11:
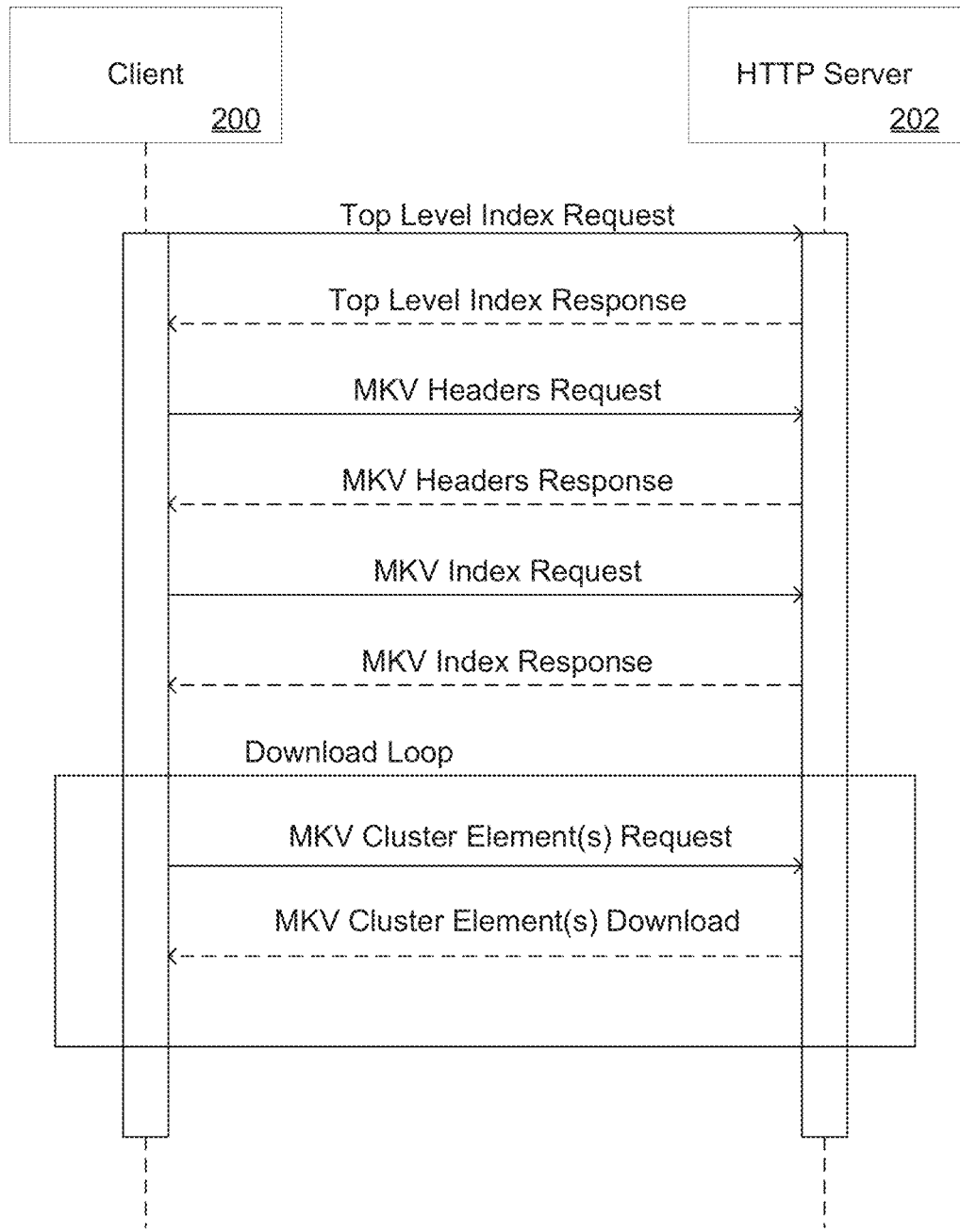
FIG. 11 conceptually illustrates communication between a playback device and an HTTP server associated with the commencement of streaming of encoded media contained within Matroska container files indexed by a top level index file in accordance with an embodiment of the invention.

Communication between a playback device or client and an HTTP server during the playback of media encoded in separate streams contained within Matroska container files indexed by a top level index file in accordance with an embodiment of the invention is illustrated in FIG. 11. In the illustrated embodiment, the playback device 200 commences playback by requesting the top level index file from the server 202 using an HTTP request or a similar protocol for retrieving data. The server 202 provides the bytes corresponding to the request. The playback device 200 then parses the top level index file to identify the URIs of each of the Matroska container files containing the streams of encoded media derived from a specific piece of source media. The playback device can then request the byte ranges corresponding to headers of one or more of the Matroska container files via HTTP or a similar protocol, where the byte ranges are determined using the information contained in the URI for the relevant Matroska container files (see discussion above). The server returns the following information in response to a request for the byte range containing the headers of a Matroska container file:

ELEM("EBML")
ELEM("SEEKHEAD")
ELEM("SEGMENTINFO")
ELEM("TRACKS")

The EBML element is typically processed by the playback device to ensure that the file version is supported. The SeekHead element is parsed to find the location of the Matroska index elements and the SegmentInfo element contains two key elements utilized in playback: TimecodeScale and Duration. The TimecodeScale specifies the timecode scale for all timecodes within the Segment of the Matroska container file and the Duration specifies the duration of the Segment based upon the TimecodeScale. The Tracks element contains the information used by the playback device to decode the encoded media contained within the Clusters element of the Matroska file including the common cryptographic information, which can take a variety of forms including but not limited to a DRMHeader element. As noted above, adaptive bitrate streaming systems in accordance with embodiments of the invention can support different streams encoded using different encoding parameters including but not limited to frame rate, and resolution. Therefore, the playback device can use the information contained within the Matroska container file's headers to configure the decoder every time a transition is made between encoded streams. Due to the fact that alternative protected streams utilize the same cryptographic information, the engine utilized to decrypt the content on the client 200 (i.e. the software process used to decrypt encrypted portions of frames of video) does not require reconfiguration using different cryptographic information with each stream switch.

In many embodiments, the playback device does not retrieve the headers for all of the Matroska container files indexed in the top level index file. Instead, the playback device determines the streams) that will be utilized to initially commence playback and requests the headers from the corresponding Matroska container files. Depending upon the structure of the URIs contained within the top level index file, the playback device can either use information from the URIs or information from the headers of the Matroska container files to request byte ranges from the server that contain at least a portion of the index from relevant Matroska container files. The byte ranges can correspond to the entire index or can correspond to the top level of a hierarchical index and a portion of a lower level index (i.e. a HierarchicalIndex element and one or more CuePoint elements). The server provides the relevant byte ranges containing the index information to the playback device, and the playback device can use the index information to request the byte ranges of Cluster elements containing encoded media using this information. When the Cluster elements are received, the playback device can extract encoded media from the BlockGroup elements within the Cluster element, and can decode and playback the media within the BlockGroup elements in accordance with their associated Timecode attributes. Prior to decoding the encoded media, the playback device can check for the presence of a DRMInfo element within each BlockGroup of a video stream to identify whether the encoded media is protected. The playback device can use the information within the DRMInfo element to decrypt encrypted portions of the video prior to decoding.

In the illustrated embodiment, the playback device 200 requests sufficient index information from the HTTP server prior to the commencement of playback that the playback device can stream the entirety of each of the selected streams using the index information. In other embodiments, the playback device continuously retrieves index information as media is played back. In several embodiments, all of the index information for the lowest bitrate steam is requested prior to playback so that the index information for the lowest bitrate stream is available to the playback device in the event that streaming conditions deteriorate rapidly during playback.

Switching Between Streams

The communications illustrated in FIG. 11 assume that the playback device continues to request media from the same streams (i.e. Matroska container files) throughout playback of the media. In reality, the streaming conditions experienced by the playback device are likely to change during the playback of the streaming media and the playback device can request media from alternative streams (i.e. different Matroska container files) to provide the best picture quality for the streaming conditions experienced by the playback device. In addition, the playback device may switch streams in order to perform a trick play function that utilizes a trick play track stream.

Figure 12A:
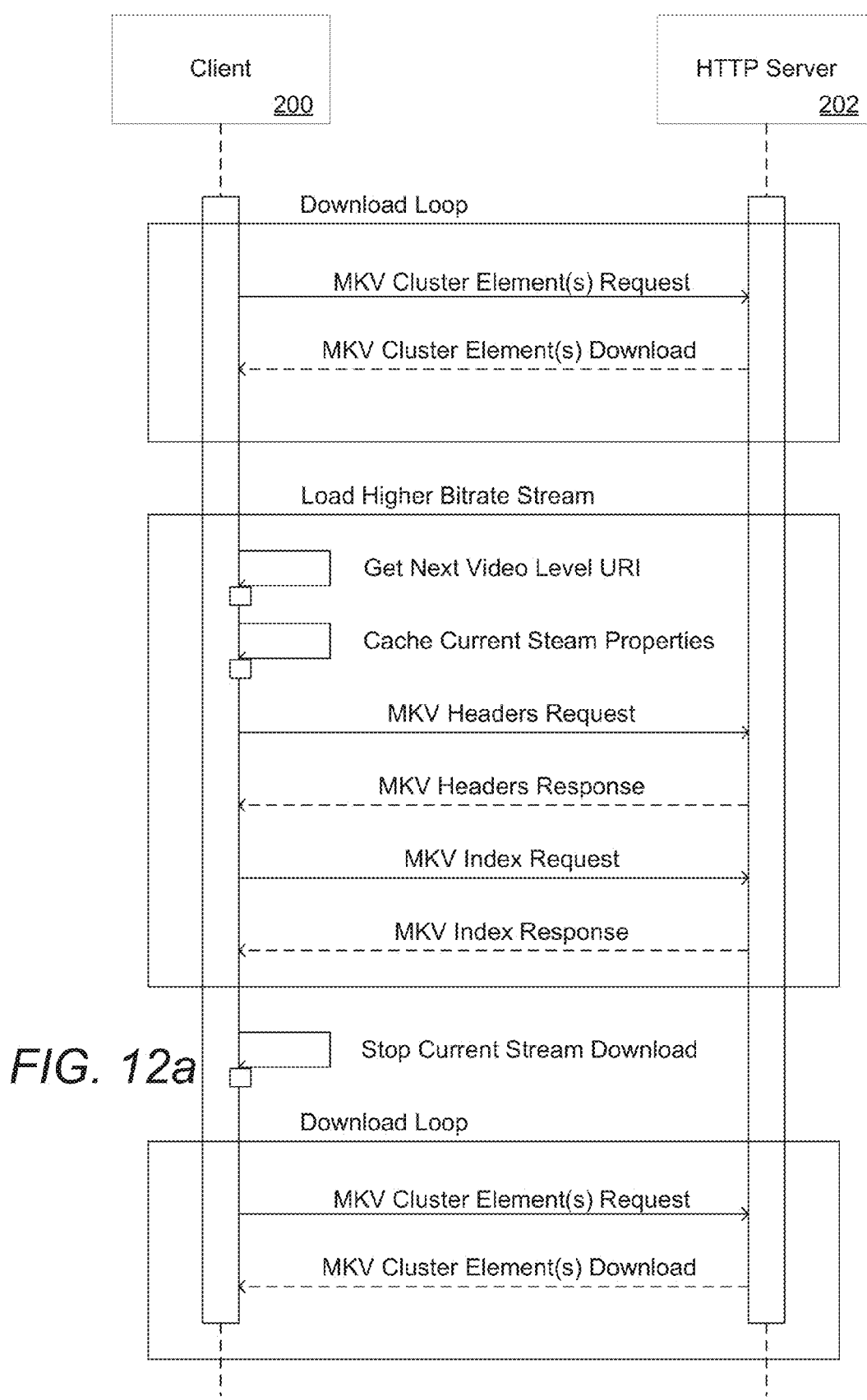
FIGS. 12a and 12b conceptually illustrate communication between a playback device and an HTTP server associated with switching between streams in response to the streaming conditions experienced by the playback device prior to the decision to switch streams in accordance with embodiments of the invention.

Communication between a playback device and a server when a playback device switches to a new stream in accordance with embodiments of the invention are illustrated in FIG. 12a. The communications illustrated in FIG. 12a assume that the index information for the new stream has not been previously requested by the playback device and that downloading of Cluster elements from the old stream proceeds while information is obtained concerning the Matroska container file containing the new stream. When the playback device 200 detects a change in streaming conditions, determines that a higher bitrate stream can be utilized at the present streaming conditions, or receives a trick play instruction from a user, the playback device can use the top level index file to identify the URI for a more appropriate alternative stream to at least one of the video, audio, or subtitle streams from which the playback device is currently requesting encoded media. The playback device can save the information concerning the current streams) and can request the byte ranges of the headers for the Matroska container file(s) containing the new streams) using the parameters of the corresponding URIs. Caching the information in this way can be beneficial when the playback device attempts to adapt the bitrate of the stream downward. When the playback device experiences a reduction in available bandwidth, the playback device ideally will quickly switch to a lower bitrate stream. Due to the reduced bandwidth experienced by the playback device, the playback device is unlikely to have additional bandwidth to request header and index information. Ideally, the playback device utilizes all available bandwidth to download already requested higher rate Cluster elements and uses locally cached index information to start requesting Cluster elements from Matroska container file(s) containing lower bitrate stream(s). When a hierarchical index is used, the playback device typically will download additional index information. However, the amount of index information that is downloaded is significantly reduced as the headers of the Matroska container file are already cached on the playback device and the playback device only needs a portion of the index in order commence requesting Cluster elements from the Matroska container file(s) containing the new stream(s).

Byte ranges for index information for the Matroska container file(s) containing the new streams) can be requested from the HTTP server 202 in a manner similar to that outlined above with respect to FIG. 11. At which point, the playback device can stop downloading of cluster elements from the previous streams and can commence requesting the byte ranges of the appropriate Cluster elements from the Matroska container file(s) containing the new streams) from the HTTP server, using the index information from the Matroska container file(s) to identify the Cluster elements) containing the encoded media following the encoded media in the last Cluster element retrieved by the playback device. As noted above, the encoding of the alternative streams so that corresponding Cluster elements within alternative streams (i.e. Cluster elements containing the same portion of the source media encoded in accordance with different encoding parameters) start with the same Timecode element and an IDR frame facilitates the smooth transition from one stream to another. In addition, the use of common cryptographic information further facilitates smooth switching between alternative streams.

When the Matroska file includes a hierarchical index, the process for switching between streams can involve downloading less than the entire index of the new streams. The index information can be downloaded by requesting the byte range for the hierarchical index and then using the Timecode attribute of media played back by the playback device 200 to identify the location of CuePoint elements within the Matroska container file(s) containing the new streams) that reference Cluster elements containing sequential encoded media and requesting the byte ranges of the CuePoint elements from the HTTP server 202. After the HTTP server has provided the byte ranges including the CuePoint elements, the playback device can use the information within the CuePoint elements to request byte ranges containing desired Cluster elements from the HTTP server. At which point, playback of the encoded media contained within the Cluster elements proceeds in the manner discussed above.

Figure 12B:
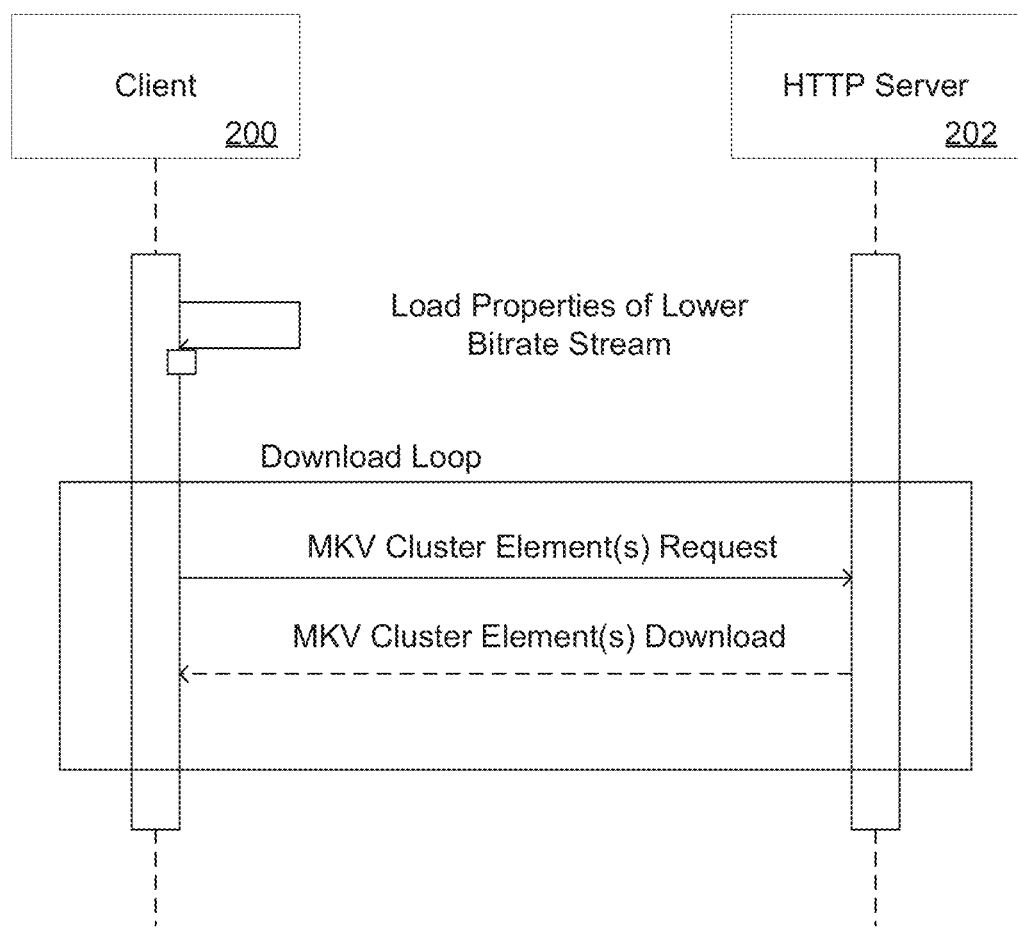

When the playback device caches the header and the entire index for each stream that has be utilized in the playback of the media, the process of switching back to a previously used stream can be simplified. The playback device already has the header and index information for the Matroska file containing the previously utilized stream and the playback device can simply use this information to start requesting Cluster elements from the Matroska container file of the previously utilized stream via HTTP. Communication between a playback device and an HTTP server when switching back to a streams) for which the playback device has cached header and index information in accordance with an embodiment of the invention is illustrated in FIG. 12*b*. The process illustrated in FIG. 12*b* is ideally performed when adapting bitrate downwards, because a reduction in available resources can be exacerbated by a need to download index information in addition to media. The likelihood of interruption to playback is reduced by increasing the speed with which the playback device can switch between streams and reducing the amount of overhead data downloaded to achieve the switch. When a hierarchical index is utilized, the playback device requests the appropriate portion of the index from the Matroska container file(s) containing the lower bitrate streams) prior to requesting Cluster elements from the Matroska container file.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A source encoder, comprising:
 a processor;
 non-volatile storage containing an encoding application for encoding and protecting frames of video to create a plurality of alternative streams of protected content;
 wherein the encoding application configures the processor to:
  receive a source content;
  obtain a common set of frame keys comprising a plurality of frame keys;
  encode the source content as a plurality of streams including a plurality of alternative streams of content, wherein each alternative stream of content comprises a plurality of encoded video frames;
  encrypt portions of several encoded video frames from each alternative stream of content using keys from the same common set of frame keys;
  after encrypting the portions of encoded video frames, write the encoded video frames of each alternative stream of protected content to a separate container file from a plurality of container files and, for each encoded video frame with an encrypted portion that is written to a given container file, write a DRM information to the given container file that identifies (i) an encrypted portion of the encoded video frame and (ii) a frame key from the common set of frame keys that can be utilized by a playback device to access the encrypted portion of the encoded video frame; and
  store an encrypted copy of the common set of frame keys in each container file, wherein each encrypted copy of the common set of frame keys has been encrypted with at least one encryption key.

2. The source encoder of claim 1, wherein the encoding application configures the processor to obtain common cryptographic information by configuring the processor to:
 send a request to a DRM server for common set of frame keys; and
 receive the common set of frame keys from the DRM server.

3. The source encoder of claim 1, wherein a title ID is associated with the common set of frame keys and the plurality of alternative streams of protected content.

4. The source encoder of claim 1, wherein the container files are Matroska container files.

5. The source encoder of claim 4, wherein the encoding application configures the processor to write a DRMHeader element to a TracksData element in a Tracks element within each of the Matroska container files, where the DRMHeader element includes the encrypted copy of the common set of frame keys.

6. The source encoder of claim 5, wherein:
 the common set of frame keys is a part of a frame key table;
 the encoding application configures the processor to:
  encrypt the frame key table using the at least one encryption key; and
  write the encrypted frame key table to the DRMHeader element of each of the Matroska container files.

7. The source encoder of claim 6, wherein:
 the source content includes a stream of video;
 the encoding application configures the processor to:
  write a BlockGroup element to a Matroska container file including the DRM information that identifies the encrypted portions of the encoded video frames and the frame keys used to access the encrypted portions of the encoded video frames.

8. The source encoder of claim 4, wherein the encoding application further configures the processor to:
 generate an index for each Matroska container file during the encoding of each of the alternative streams of protected content; and
 write a Cues element containing the index to the indexed Matroska container file.

9. A method of encoding and protecting source content as a plurality of alternative streams of protected content, comprising:
 receiving a source content using a source encoder;
 obtaining a common set of frame keys comprising a plurality of frame keys using the source encoder;
 encoding the source content as a plurality of streams including a plurality of alternative streams of content using the source encoder, wherein each alternative stream of content comprises a plurality of encoded video frames;

encrypting portions of several encoded video frames from each alternative stream of content using keys from the same common set of frame keys and the source encoder;

after encrypting the portions of encoded video frames, writing the encoded video frames of each given alternative stream of protected content to a separate container file from a plurality of container files using the source encoder and, for each encoded video frame with an encrypted portion that is written to a given container file, writing a DRM information to the given container file that identifies (i) an encrypted portion of the encoded video frame and (ii) a frame key from the common set of frame keys that can be utilized by a playback device to access the encrypted portion of the encoded video frame; and storing an encrypted copy of the common set of frame keys in each container file using the source encoder, wherein each encrypted copy of the common set of frame keys has been encrypted with at least one encryption key.

10. The method of claim 9, wherein obtaining the common set of frame keys comprises:

sending a request to a DRM server for the common set of frame keys using the source encoder; and receiving the common set of frame keys from the DRM server.

11. The method of claim 9, further comprising associating a title ID with the common set of frame keys and the plurality of alternative streams of protected content.

12. The method of claim 9, wherein the container files are Matroska container files.

13. The method of claim 12, further comprising writing a DRMHeader element to a TracksData element in a Tracks element within each of the Matroska container files using the source encoder, where the DRMHeader element includes the encrypted copy of the common set of frame keys.

14. The method of claim 13, wherein the common set of frame keys is a part of a frame key table and the method further comprises:

encrypting the frame key table using the at least one encryption key using the source encoder; and writing the encrypted frame key table to the DRMHeader element of each of the Matroska container files using the source encoder.

15. The method of claim 14, wherein the source content includes a stream of video and the method further comprises:

writing a BlockGroup element to a Matroska container file including the DRM information that identifies the encrypted portions of the encoded video frames and the frame keys used to access the encrypted portions of the encoded video frames using the source encoder.

16. The method of claim 12, further comprising:

generating an index for each Matroska container file using the source encoder during the encoding of each of the alternative streams of protected content; and writing a Cues element containing the index to the indexed Matroska container file using the source encoder.

17. A non-transitory machine readable medium containing processor instructions, where execution of the instructions by a processor causes the processor to perform a process comprising:

receiving a source content;

obtaining a common set of frame keys comprising a plurality of frame keys;

encoding the source content as a plurality of streams including a plurality of alternative streams of content, wherein each alternative stream of content comprises a plurality of encoded video frames;

encrypting portions of several encoded video frames from each alternative stream of content using keys from the same common set of frame keys;

after encrypting the portions of encoded video frames, writing the encoded video frames of each given alternative stream of protected content to a separate container file and, for each encoded video frame with an encrypted portion that is written to a given container file, writing a DRM information to the given container file that identifies an encrypted portion of the encoded video frame and a frame key from the common set of frame keys that can be utilized by a playback device to access the encrypted portion of the encoded video frame; and storing an encrypted copy of the common set of frame keys in each container file, wherein each encrypted copy of the common set of frame keys has been encrypted with at least one encryption key.

18. A content distribution system, comprising:

a DRM server;

a content distribution server;

a source encoder configured to:

receive source content;

obtain a common set of frame keys comprising a plurality of frame keys from the DRM server;

encode the source content as a plurality of streams including a plurality of alternative streams of content associated with a title, wherein each alternative stream of content comprises a plurality of encoded video frames;

encrypt portions of several encoded video frames from each alternative stream of content using keys from the same common set of frame keys;

after encrypting the portions of encoded video frames, write the encoded video frames of each alternative stream of protected content to a separate container file from a plurality of container files and, for each encoded video frame with an encrypted portion that is written to a given container file, write a DRM information to the given container file that identifies (i) an encrypted portion of the encoded video frame and (ii) a frame key from the common set of frame keys that can be utilized by a playback device to access the encrypted portion of the encoded video frame;

store an encrypted copy of the common set of frame keys in each container file, wherein each encrypted copy of the common set of frame keys has been encrypted with at least one encryption key;

provide the plurality of container files containing the plurality of alternative streams of protected content associated with the title to the content distribution server;

wherein the DRM server is configured to:

receive a request for access to the alternative streams of protected content associated with the title from a playback device;

securely provide a copy of the at least one encryption key used to encrypt the common set of frame keys to the playback device; and wherein the content distribution server is configured to grant the playback device access to the alternative streams of protected content associated with the title.

19. The content distribution system of claim 18, wherein the DRM server is configured to associate a title ID with the title.

20. The content distribution system of claim 19, wherein the DRM server is configured to associate the common set of frame keys with the title ID.

21. The content distribution system of claim 19, wherein the request for access to the alternative streams of protected content associated with the title comprises a request identifying a title ID.

22. The content distribution system of claim 18, wherein the content distribution server is further configured to:
receive requests for portions of at least one container file from the playback device; and
provide the requested portions of the at least one container file to the playback device.

23. The content distribution system of claim 18, wherein the plurality of container files are Matroska container files.

24. The content distribution system of claim 23, wherein the source encoder is configured to write a DRMHeader element to a TracksData element in a Tracks element within each of the Matroska container files, where the DRMHeader element includes the encrypted copy of the common set of frame keys.

25. The source encoder of claim 24, wherein:
the common set of frame keys is a part of a frame key table;
the source encoder is configured to:
encrypt the frame key table using the at least one encryption key; and
write the encrypted frame key table to the DRMHeader element of each of the Matroska container files.

26. The content distribution system of claim 25, wherein the source content includes a stream of video; and
the source encoder is configured to:
write a BlockGroup element to a Matroska container file including the DRM information that identifies the encrypted portions of the encoded video frames used to access the encrypted portions of the encoded video frames.

27. The content distribution system of claim 23, wherein the source encoder is configured to:
generate an index for each Matroska container file during the encoding of each of the alternative streams of protected content; and
write a Cues element containing the index to the indexed Matroska container file.

28. A method of distributing content encoded as a plurality of alternative streams of protected content, the method comprising:
receiving a source content using a source encoder;
obtaining a common set of frame keys from a DRM server using the source encoder, wherein the common set of frame keys comprises a plurality of frame keys;
encoding the source content as a plurality of streams including a plurality of alternative streams of content using the source encoder, wherein each alternative stream of content comprises a plurality of encoded video frames;
encrypting portions of several encoded video frames from each alternative stream of content using keys from the same common set of frame keys and the source encoder;
after encrypting the portions of encoded video frames, writing the encoded video frames of each given alternative stream of protected content to a separate container file from a plurality of container files using the source encoder and, for each encoded video frame with an encrypted portion that is written to a given container file, writing a DRM information to the given container file that identifies (i) an encrypted portion of the encoded video frame and (ii) a frame key from the common set of frame keys that can be utilized by a playback device to access the encrypted portion of the encoded video frame;
storing an encrypted copy of the common set of frame keys in each container file using the source encoder, wherein each encrypted copy of the common set of frame keys has been encrypted with at least one encryption key;
providing the plurality of container files containing the plurality of alternative streams of protected content to a content distribution server;
receiving a request for access to the alternative streams of protected content from a playback device using the DRM server, wherein the plurality of alternative streams of protected content are associated with a title;
securely providing to the playback device at least one encryption key using the DRM server, where the at least one encryption keys is used to access the encrypted common cryptographic information; and
granting the playback device access to the alternative streams of protected content using the content distribution server.

29. The method of claim 28, wherein the title is identified using a title ID.

30. The method of claim 29, wherein the common set of frame keys is associated with the title ID.

31. The method of claim 29, wherein the request for access to the alternative streams of protected content associated with the title comprises a request identifying a title ID.

32. The method of claim 28, further comprising:
receiving requests for portions of at least one container file from the playback device using the content distribution server; and
providing the requested portions of the at least one container file to the playback device using the content distribution server.

33. The method of claim 28, wherein the plurality of container files are Matroska container files.

34. The method of claim 28, wherein the container files are Matroska container files.

35. The method of claim 34, further comprising writing a DRMHeader element to a TracksData element in a Tracks element within each of the Matroska container files using the source encoder, where the DRMHeader element includes the encrypted copy of the common set of frame keys.

36. The method of claim 35, wherein the common set of frame keys is a part of a frame key table, the method further comprising:
encrypting the frame key table using the at least one encryption key; and
writing the encrypted frame key table to the DRMHeader element of each of the Matroska container files using the source encoder.

37. The method of claim 36, wherein the source content includes a stream of video, the method further comprising:
writing a BlockGroup element to a Matroska container file including the DRM information that identifies the encrypted portions of the encoded video frames and the frame keys used to access the encrypted portions of the encoded video frames using the source encoder.

38. The method of claim 34, further comprising:
generating an index for each Matroska container file during the encoding of each of the alternative streams of protected content using the source encoder; and
writing a Cues element containing the index to the indexed Matroska container file using the source encoder.

* * * * *